(12) United States Patent
Fujino

(10) Patent No.: US 12,530,019 B2
(45) Date of Patent: Jan. 20, 2026

(54) INFORMATION PROCESSING SYSTEM

(71) Applicant: KYOCERA Corporation, Kyoto (JP)

(72) Inventor: Tomokazu Fujino, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 456 days.

(21) Appl. No.: 17/631,141

(22) PCT Filed: Jul. 29, 2020

(86) PCT No.: PCT/JP2020/029030
§ 371 (c)(1),
(2) Date: Jan. 28, 2022

(87) PCT Pub. No.: WO2021/020434
PCT Pub. Date: Feb. 4, 2021

(65) Prior Publication Data
US 2022/0261725 A1    Aug. 18, 2022

(30) Foreign Application Priority Data

Jul. 30, 2019   (JP) .................................. 2019-139989
Jul. 30, 2019   (JP) .................................. 2019-140006

(51) Int. Cl.
*G05B 19/418*      (2006.01)
*G06Q 10/0631*     (2023.01)
*H04L 9/40*        (2022.01)

(52) U.S. Cl.
CPC ..... *G05B 19/418* (2013.01); *G05B 19/41855* (2013.01); *G06Q 10/06315* (2013.01); *H04L 63/0218* (2013.01)

(58) Field of Classification Search
CPC ............ G05B 19/418; G05B 19/41855; G06Q 10/06315; G06Q 10/06; G06Q 10/04; G06Q 50/04; H04L 63/0218; H04L 67/12; H04L 67/563; H04L 63/02; G06F 9/5072; G06F 9/54; G06N 3/08; G06N 20/00; Y02P 90/30; G16Y 20/20; G16Y 40/10
See application file for complete search history.

(56) References Cited

U.S. PATENT DOCUMENTS

| | | | |
|---|---|---|---|
| 5,774,633 A | 6/1998 | Baba et al. | |
| 9,985,984 B1* | 5/2018 | Chavez | ............... G06N 20/20 |
| 2016/0098037 A1 | 4/2016 | Zornio et al. | |
| 2016/0274553 A1* | 9/2016 | Strohmenger | ......... G05B 17/02 |

(Continued)

FOREIGN PATENT DOCUMENTS

| | | |
|---|---|---|
| JP | H10-91208 A | 4/1998 |
| JP | 2007-110590 A | 4/2007 |

(Continued)

OTHER PUBLICATIONS

Oracle, "Siebel Security Hardening Guide", Siebel Innovation Pack 2013, Version 8.1/8.2, Sep. 2013, 91 pages.

*Primary Examiner* — Chad G Erdman
(74) *Attorney, Agent, or Firm* — Procopio, Cory, Hargreaves & Savitch LLP

(57) ABSTRACT

An information processing system includes a first system in an intranet of an organization, a second system of the organization being outside the intranet, and a server connected to the second system over an Internet outside the intranet. The second system communicates with the first system through the server located outside the intranet.

17 Claims, 12 Drawing Sheets

(56) References Cited

U.S. PATENT DOCUMENTS

| | | | |
|---|---|---|---|
| 2016/0274978 A1* | 9/2016 | Strohmenger | G05B 15/02 |
| 2017/0357250 A1* | 12/2017 | Sandler | G06Q 10/00 |
| 2018/0336486 A1* | 11/2018 | Chu | G06N 20/00 |
| 2019/0064787 A1 | 2/2019 | Maturana | |
| 2019/0311228 A1* | 10/2019 | Zhao | G06T 7/0014 |
| 2020/0034545 A1 | 1/2020 | Takao | |
| 2020/0068019 A1* | 2/2020 | Tezuka | G16Y 20/10 |
| 2020/0117953 A1* | 4/2020 | Cooper | G06V 20/00 |
| 2020/0327371 A1* | 10/2020 | Sharma | G06N 5/04 |
| 2020/0342290 A1* | 10/2020 | Carothers | G06N 3/063 |
| 2020/0349216 A1* | 11/2020 | Das Sarma | G06F 7/5443 |
| 2022/0249868 A1* | 8/2022 | Fay | A61N 5/1039 |

FOREIGN PATENT DOCUMENTS

| | | |
|---|---|---|
| JP | 2018-173711 A | 11/2018 |
| JP | 2019-033369 A | 2/2019 |

* cited by examiner

INFORMATION PROCESSING SYSTEM

CROSS-REFERENCE TO RELATED APPLICATION

The present application is a National Phase entry based on PCT Application No. PCT/JP2020/029030 filed on Jul. 29, 2020, entitled "INFORMATION PROCESSING SYSTEM", which claims the benefit of Japanese Patent Application Nos. 2019-139989 filed on Jul. 30, 2019, entitled "INFORMATION PROCESSING SYSTEM" and 2019-140006 filed on Jul. 30, 2019, entitled "INFORMATION PROCESSING SYSTEM". The contents of which are incorporated by reference herein in their entirety.

FIELD

Embodiments of the present disclosure relate to an information processing system.

BACKGROUND

Patent Literature 1 describes a technique for an information processing system.

CITATION LIST

Patent Literature

Patent Literature 1: Japanese Unexamined Patent Application Publication No. 2019-33369

SUMMARY

An information processing system is disclosed. In one embodiment, an information processing system includes a first system in an intranet of an organization, a second system of the organization being outside the intranet, and a server connected to the second system over an Internet outside the intranet. The second system communicates with the first system through the server located outside the intranet.

In one embodiment, an information processing system includes a first model in an intranet. The first model is a model selected from a machine learning model and a statistical analysis model. The information processing system performs at least one of first processing of inputting first information in the intranet into the first model, and inputting, into a second model being the selected model included in a cloud server located outside the intranet and connected to an Internet, second information output from the first model in response to an input of the first information, or second processing of inputting, into the first model, third information in the intranet and fourth information output from the second model.

DETAILED DESCRIPTION

Figure 1:
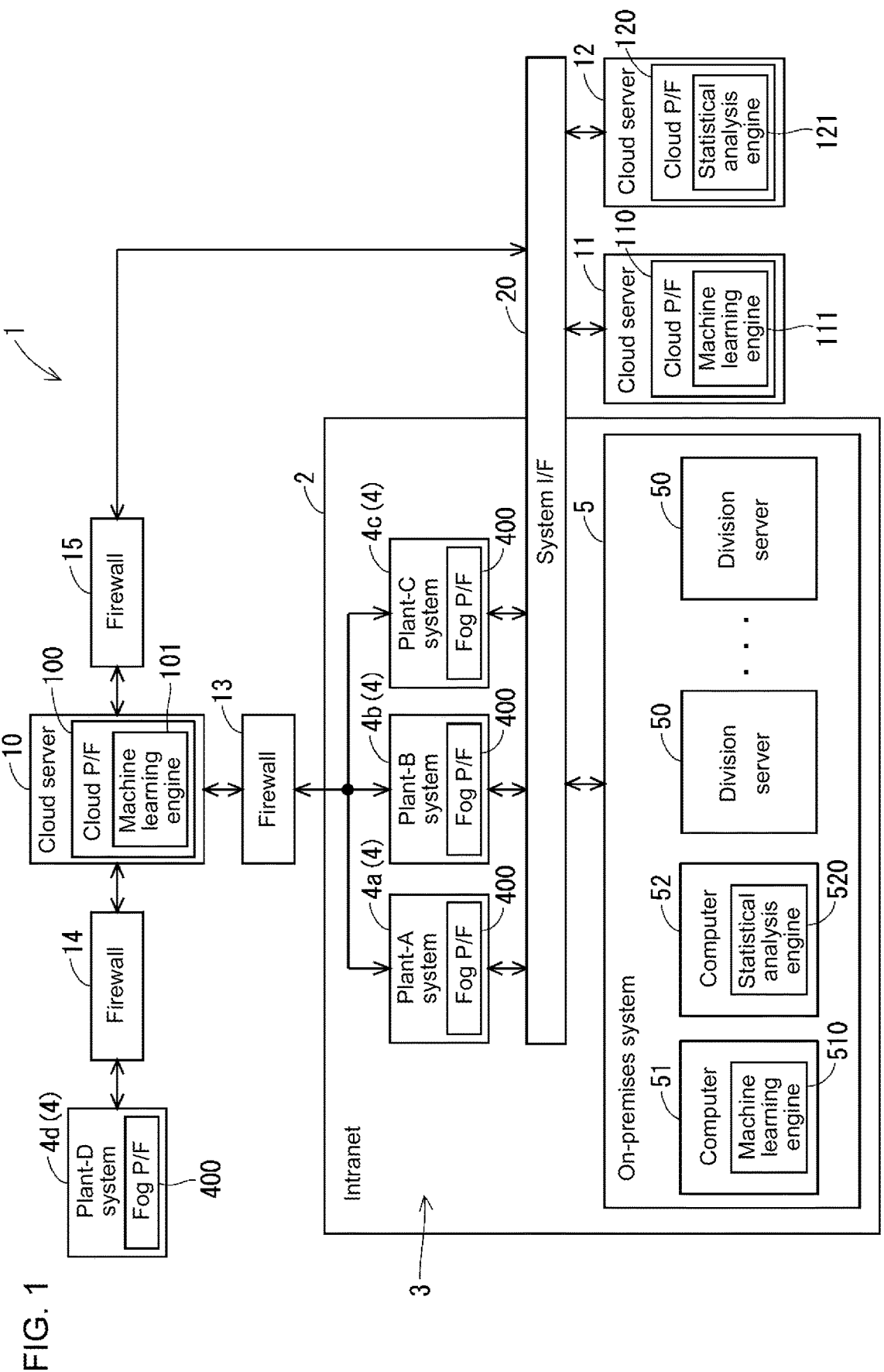
FIG. 1 illustrates a block diagram of an information processing system showing an example configuration.

FIG. 1 is a block diagram of an information processing system 1 showing an example configuration. For example, the information processing system 1 includes an intranet for a specific organization. For example, the specific organization refers to a corporation. For example, the information processing system 1 includes an intranet for a corporation including multiple plants. The information processing system 1 is an example of the Internet of Things (IoT) system. The information processing system 1 is a plant IoT system.

As shown in FIG. 1, the information processing system 1 includes an intranet 2 belonging to a certain corporation (specific organization). The certain corporation may be hereafter referred to as the specific corporation. For example, the specific corporation includes plants A to D individually located at different sites. The specific corporation may include a different number of plants.

The intranet 2 includes an information processing system 3. The information processing system 3 includes a plant-A system 4*a*, a plant-B system 4*b*, a plant-C system 4*c*, and an on-premises system 5. The plant-A system 4*a* is an information processing system belonging to plant A. The plant-B system 4*b* is an information processing system belonging to plant B. The plant-C system 4*c* is an information processing system belonging to plant C. The on-premises system 5 is a backbone system belonging to the specific corporation and an example information processing system.

The plant-A system 4*a*, the plant-B system 4*b*, and the plant-C system 4*c* are connected to one another. The plant-A system 4*a*, the plant-B system 4*b*, the plant-C system 4*c*, and the on-premises system 5 are connected to a system I/F 20. I/F refers to an interface. The system I/F 20 has the function of connecting multiple systems included in the intranet 2, and the function of connecting a system in the intranet 2 with a device outside the intranet 2. The plant-A system 4*a*, the plant-B system 4*b*, and the plant-C system 4*c* can each communicate with the on-premises system 5 through the system I/F 20.

The information processing system 1 includes, in addition to the intranet 2, a plant-D system 4d, servers 10, 11, and 12 (cloud servers 10, 11, and 12 in one embodiment), and firewalls 13, 14, and 15. The plant-D system 4d, the cloud servers 10, 11, and 12, and the firewalls 13, 14, and 15 are located outside the intranet 2 and connected to the Internet.

The plant-D system 4d is an information processing system belonging to plant D of the specific corporation. The plant-D system 4d is installed outside the intranet 2 although belonging to the specific corporation. Each of the firewalls 13, 14, and 15 is a computer. Each of the cloud servers 10, 11, and 12 is a computer.

The firewall 13 is connected to the intranet 2 and the cloud server 10. The firewall 14 is connected to the plant-D system 4d and the cloud server 10. The firewall 15 is connected to the cloud server 10 and the system I/F 20. The cloud servers 11 and 12 are connected to the system I/F 20.

The plant-D system 4d can communicate with each of the plant-A system 4a, the plant-B system 4b, and the plant-C system 4c in the intranet 2 through the firewall 14, the cloud server 10, and the firewall 13.

The plant-A system 4a, the plant-B system 4b, the plant-C system 4c, and the plant-D system 4d may each be referred to as the plant system 4, unless they are distinguished. The plant systems 4 in the intranet 2 may be referred to as the intra-plant systems 4, whereas the plant systems 4 outside the intranet 2 may be referred to as the extra-plant systems 4. The plant-D system 4d may be referred to as the extra-plant system 4d.

For example, the cloud server 10 is managed and operated by a corporation other than the specific corporation. The cloud server 10 can communicate with the plant-D system 4d through the firewall 14. The cloud server 10 can also communicate with each of the plant-A system 4a, the plant-B system 4b, and the plant-C system 4c in the intranet 2 through the firewall 13. The cloud server 10 can also communicate with the on-premises system 5 in the intranet 2 through the firewall 15 and the system I/F 20.

The cloud server 10 includes hardware and software that cooperate with each other to establish a cloud P/F 100 for providing at least one service in the cloud server 10. P/F refers to a platform. For example, the cloud P/F 100 includes a machine learning engine 101. The machine learning engine 101 is also a machine learning device. The machine learning engine 101 generates a machine learning model that outputs an inference. More specifically, the machine learning engine 101 trains the machine learning model using input information to generate a trained machine learning model. The machine learning engine 101 then inputs information into the trained machine learning model and uses information output from the trained machine learning model as an inference. The machine learning model may be referred to as the learning model. The trained machine learning model may be hereafter referred to as the trained model. The trained model may be referred to as the inference model.

For example, the machine learning engine 101 uses deep learning. In this case, the learning model includes a neural network. The machine learning engine 101 trains the parameters of the neural network to generate a trained model. The parameters of the neural network include weighting coefficients indicating weights on the connections between artificial neurons. The machine learning engine 101 may perform unsupervised learning or supervised learning. The machine learning engine 101 may also perform reinforcement learning. The combination of deep learning and reinforcement learning is referred to as deep reinforcement learning. A learning model including a neural network may be referred to as artificial intelligence (AI) model. The machine learning engine 101 may use a machine learning technique other than deep learning.

For example, the cloud server 11 is managed and operated by a corporation other than the specific corporation. The cloud server 11 can communicate with each plant system 4 and the on-premises system 5 in the intranet 2 through the system I/F 20. The cloud server 11 includes hardware and software that cooperate with each other to establish a cloud P/F 110 for providing at least one service in the cloud server 11. For example, the cloud P/F 110 includes a machine learning engine 111. For example, the machine learning engine 111 has performance different from the performance of the machine learning engine 101.

For example, the machine learning engine 111 uses deep learning. In this case, the machine learning engine 111 trains the parameters of the neural network included in a learning model to generate a trained model. The machine learning engine 111 may perform unsupervised learning or supervised learning. The machine learning engine 111 may also perform reinforcement learning. The machine learning engine 111 may use a technique other than deep learning.

For example, the cloud server 12 is managed and operated by a corporation other than the specific corporation. The cloud server 12 can communicate with each plant system 4 and the on-premises system 5 in the intranet 2 through the system I/F 20. The cloud server 12 includes hardware and software that cooperate with each other to establish a cloud P/F 120 for providing at least one service in the cloud server 12. For example, the cloud P/F 120 includes a statistical analysis engine 121. The statistical analysis engine 121 is also a statistical analysis device. For example, the statistical analysis engine 121 can perform regression analysis. The statistical analysis engine 121 statistically analyzes input information to generate a statistical analysis model that outputs predetermined information. The statistical analysis model outputs predetermined information in accordance with the input information.

At least one of the cloud server 10, 11, or 12 may be managed and operated by the specific corporation.

Example Configuration of Plant System

The example configuration of the plant systems 4 will now be described. Each plant system 4 can transmit information obtained from devices such as a sensor to the cloud server 10. Each plant system 4 can also control the devices based on information from the cloud server 10.

Figure 2:
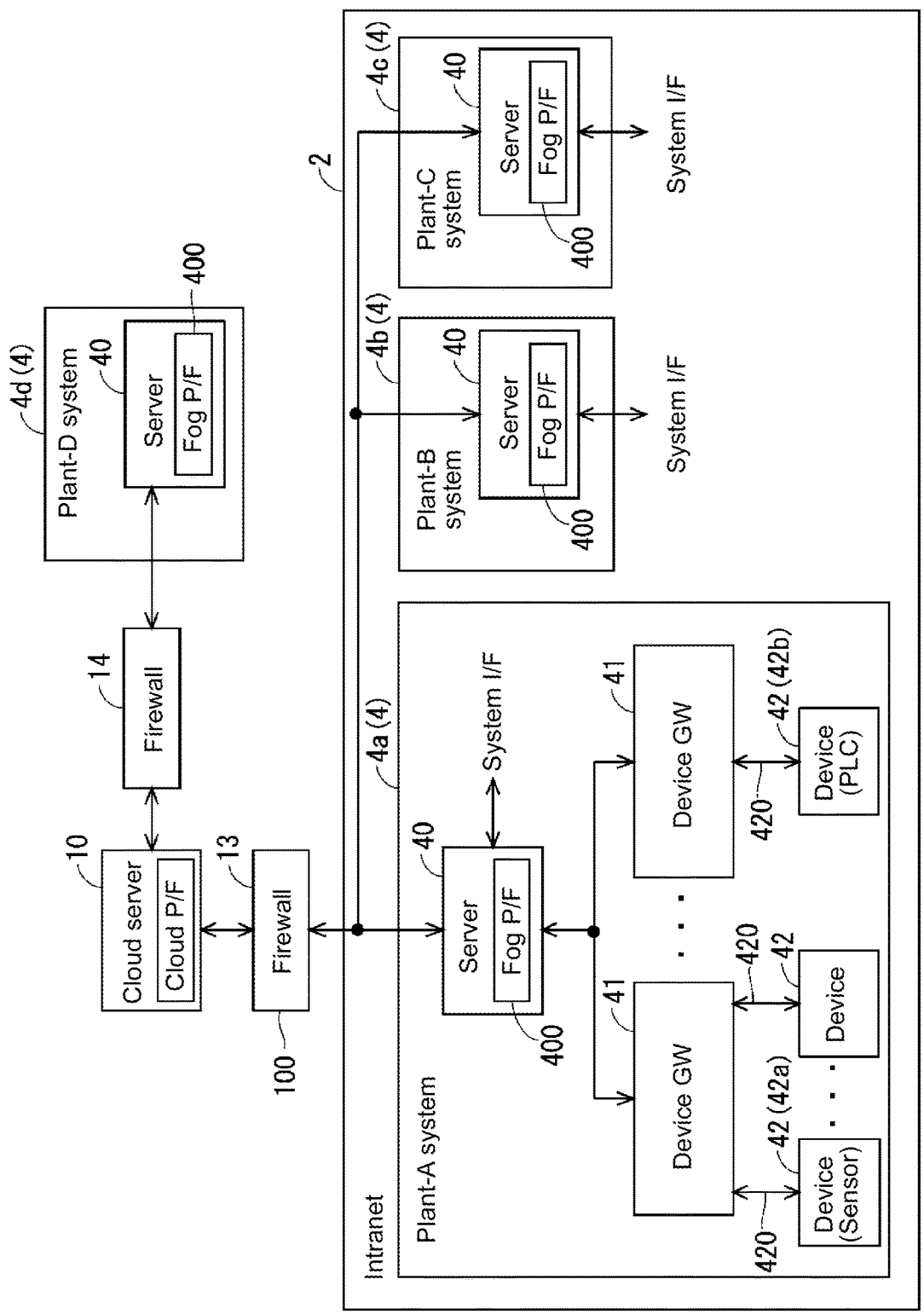
FIG. 2 illustrates a block diagram of plant systems showing an example configuration.

FIG. 2 is a block diagram of the plant systems 4 showing an example configuration. The plant systems 4 included in the information processing system 1 have the same configuration. For simplicity, FIG. 2 shows the configuration of the plant-A system 4a in more detail.

As shown in FIG. 2, each plant system 4 includes a server 40, multiple device gateways 41, and multiple devices 42. The server 40 and the device gateways 41 are computers. For example, the server 40 has higher computer performance than the device gateways 41. Each of the devices 42 is connected to one of the device gateways 41. The device gateways 41 may be referred to as the device GWs 41.

The information processing system 1 in this example uses fog computing. For example, fog computing refers to a processing environment near terminals in a network environment. The server 40 includes hardware and software that cooperate with each other to establish a fog P/F 400 for controlling each device GW 41 in the server 40. The fog P/F 400 manages the plant system 4 to which it belongs. The fog P/F 400 in each intra-plant system 4 can communicate with the cloud P/F 100 through the firewall 13. The servers 40 in the multiple intra-plant systems 4 are connected to one another. The fog P/Fs 400 in the multiple intra-plant systems 4 can communicate with each other. The server 40 in each intra-plant system 4 is connected to the system I/F 20. The fog P/F 400 in each intra-plant system 4 can communicate with the on-premises system 5, the cloud P/F 110, and the cloud P/F 120 through the system I/F 20.

The fog P/F 400 in the extra-plant system 4*d* can communicate with the cloud P/F 100 through the firewall 14. The fog P/F 400 in the extra-plant system 4*d* can communicate with the fog P/F 400 in each intra-plant system 4 through the firewall 14, the cloud server 10, and the firewall 13. The fog P/F 400 in the extra-plant system 4*d* can communicate with the on-premises system 5, the cloud P/F 110, and the cloud P/F 120 through the firewall 14, the cloud server 10, the firewall 13, a fog P/F 400 in the intra-plant system, and the system I/F 20. The fog P/F 400 in the extra-plant system 4*d* may communicate with the on-premises system 5, the cloud P/F 110, and the cloud P/F 120 through the firewall 14, the cloud server 10, the firewall 15, and the system I/F 20.

In this manner, the information processing system 1 allows the fog P/Fs 400 in the multiple plant systems 4 and the cloud P/F 100 to exchange information with each other. The fog P/F 400 in each plant system 4 can exchange information with each of the on-premises system 5, the cloud P/F 110, and the cloud P/F 120. For example, the fog P/F 400 may be operated based on a rule. In this case, the fog P/F 400 may operate under a preset rule.

Each device GW 41 is connected with at least one device 42. The device GW 41 obtains information 420 from at least one device 42 connected to it, and transmits the information 420 to the fog P/F 400. The device GW 41 may control the device 42 connected to it in response to an instruction from the fog P/F 400.

At least one device 42 connected to one device GW 41 includes, for example, at least one of a sensor or a programmable logic controller (PLC). The PLC may be referred to as a sequencer. A sensor as a device 42 may be hereafter referred to as a sensor 42*a*, and a PLC as a device 42 may be referred to as a PLC 42*b* (refer to FIG. 2).

The sensor 42*a* performs detection and outputs detected information, for example, once every few seconds. The multiple devices 42 included in the plant system 4 may include at least one sensor selected from a temperature sensor, a humidity sensor, an acceleration sensor, a vibration sensor, a pH sensor, an illuminance sensor, a position sensor, an atmospheric pressure sensor, a water level sensor, a flow sensor, a voltage sensor, a current sensor, an electrical resistance sensor, a microphone, and a camera. The sensor 42*a* in the plant system 4 is not limited to these types.

The PLC 42*b* can control at least one control target in the plant. The PLC 42*b* controls the control target(s) based on an output from, for example, a switch and a sensor. The control target(s) controlled by the PLC 42*b* may include at least one of a lamp, a buzzer, a motor, a valve, a pump, a sensor, or a robot. The device GW 41 can obtain, from the PLC 42*b*, information about the target connected to it. For example, the device GW 41 can obtain, from the PLC 42*b*, the on-off state of the switch, the lighting state of the lamp, the sounding state of the buzzer, the rotational speed of the motor, the opening degree of the valve, the operating state of the pump, detected information from the sensor, alarm information output from the sensor, the on-off state of the sensor, or the operating state of the robot. The target controlled by the PLC 42*b* is not limited to these types.

The number of device GWs 41 included in each plant system 4 is determined for each plant. Thus, the numbers of device GWs 41 included in the plant systems 4 may differ between at least two plant systems 4. Additionally, the number and type of devices 42 included in each plant system 4 are determined for each plant. Thus, the numbers and types of devices 42 included in the plant systems 4 may differ between at least two plant systems 4.

The fog P/F 400 tracks the status of the plant system 4 managed by the fog P/F 400. Examples of the status of the plant system 4 tracked by the fog P/F 400 include the types of the device GWs 41 connected to the fog P/F 400 and the types of the operations performed by the device GWs 41. Examples of the status of the plant system 4 tracked by the fog P/F 400 also include the types of the devices 42 connected to the device GWs 41, which are connected to the fog P/F 400, and the types of the operations performed by the devices 42.

Figure 3:
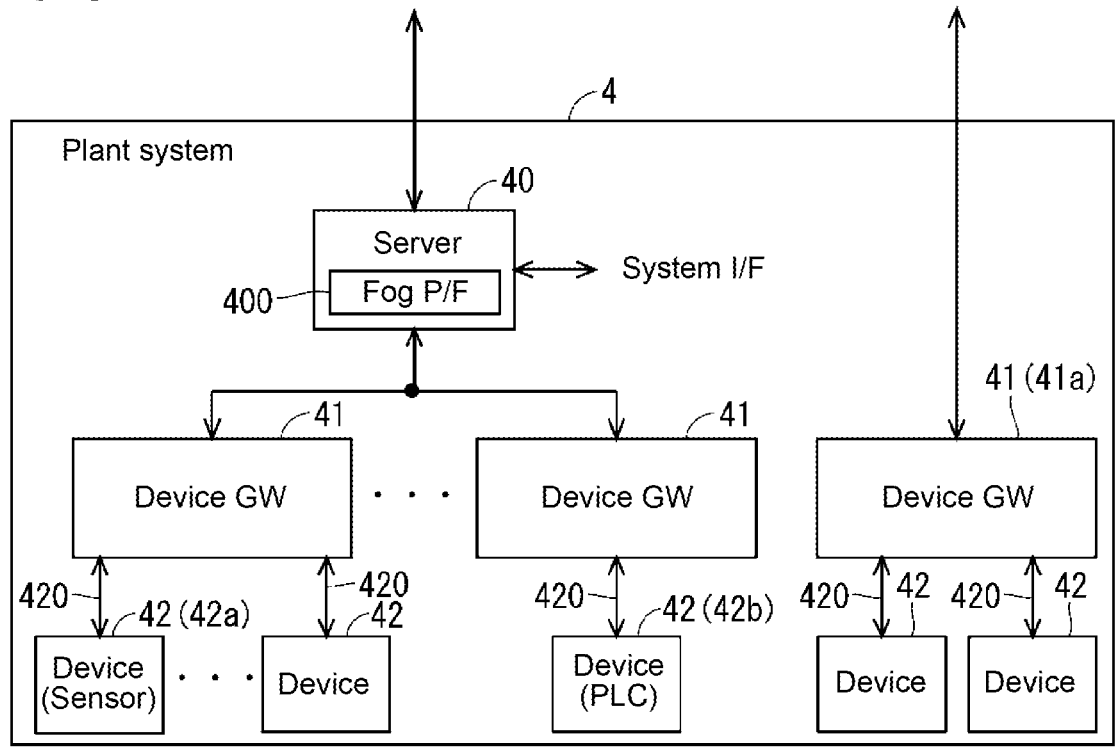
FIG. 3 illustrates a block diagram of a plant system showing an example configuration.

At least one of the plant systems 4 may include a device GW 41 that is not controlled by the server 40. FIG. 3 is a block diagram of a plant system 4 including a device GW 41 that is not controlled by the server 40 showing an example configuration. In the example shown in FIG. 3, the fog P/F 400 in the server 40 cannot control one device GW 41*a* included in the multiple device GWs 41. With the device GW 41*a* installed in an intra-plant system 4, the device GW 41*a* communicates with the cloud server 10 through the firewall 13. With the device GW 41*a* installed in the extra-plant system 4*d*, the device GW 41*a* communicates with the cloud server 10 through the firewall 14. The device GW 41*a* can transmit the information 420 obtained from the devices 42 to the cloud P/F 100. In the example below, the plant-D system 4*d* outside the intranet 2 has the configuration shown in FIG. 3.

For a plant system 4 in which the devices 42 include multiple PLCs 42*b*, a master PLC to which the PLCs 42*b* are connected may be connected to a device GW 41. In this case, the device GW 41 can obtain the information 420 from the PLCs 42*b* though the master PLC.

Figure 4:
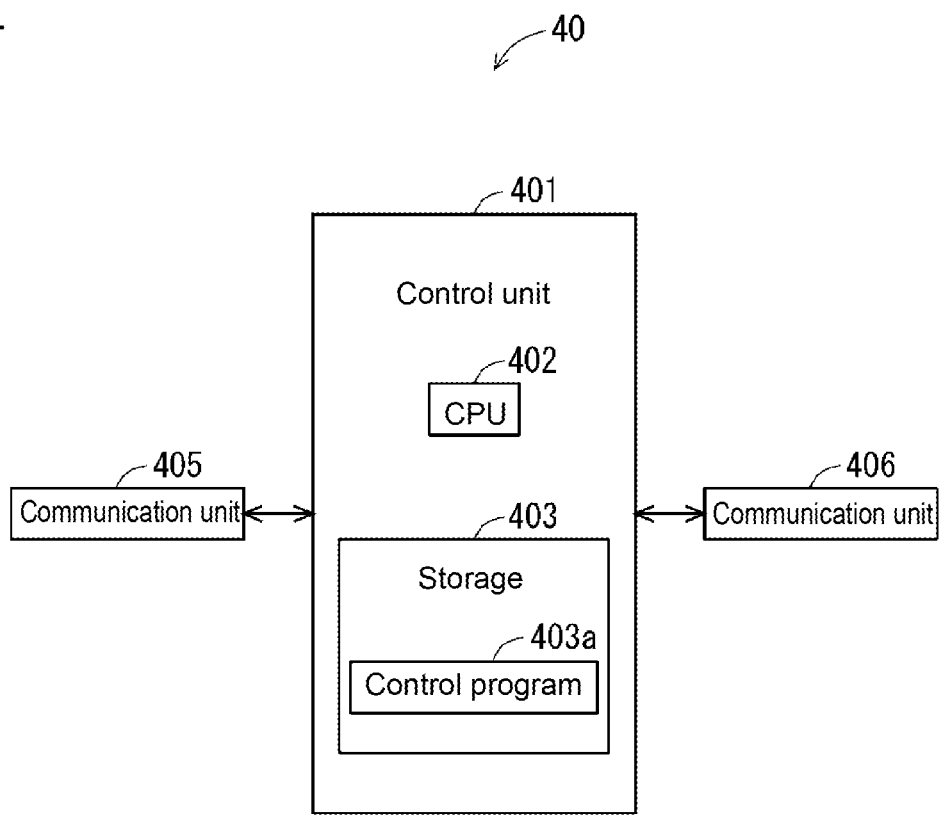
FIG. 4 illustrates a block diagram of a server showing an example configuration.
Figure 5:
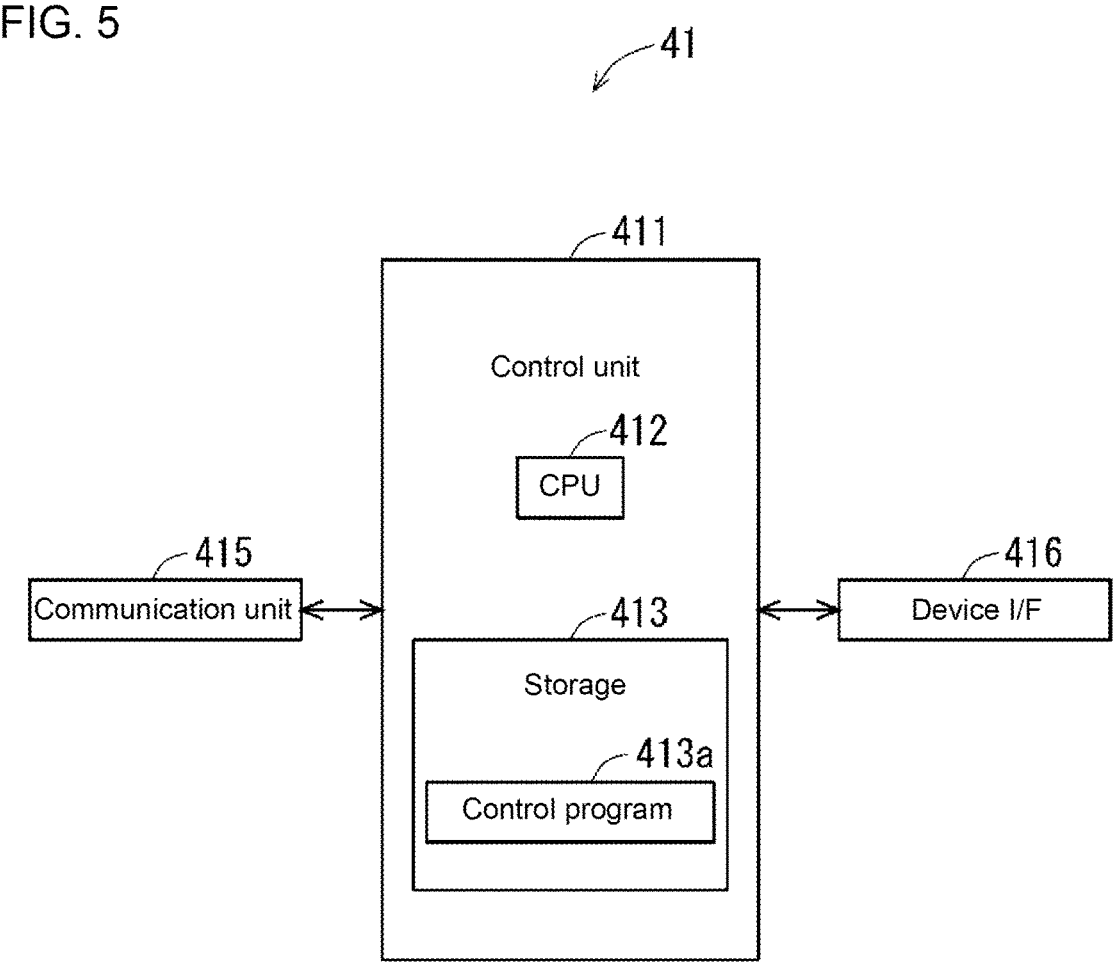
FIG. 5 illustrates a block diagram of a device gateway showing an example configuration.

FIG. 4 is a block diagram of the server 40 showing an example configuration. FIG. 5 is a block diagram of the device GW 41 showing an example configuration. As shown in FIG. 4, the server 40 includes a controller 401 and communication units 405 and 406. The controller 401 can control the other components of the server 40 to centrally manage the operation of the server 40. The controller 401 is also a controller or a control circuit. As described in more detail below, the controller 401 includes at least one processor to provide control and processing capabilities for implementing various functions.

In some embodiments, the processor(s) may be implemented as a single integrated circuit (IC) or multiple communicably connected ICs and/or discrete circuits. The processor(s) can be implemented in accordance with various known techniques.

In one embodiment, for example, the processor includes one or more circuits or units that execute instructions stored in an associated memory to perform one or more data computation procedures or processes. In another embodiment, the processor may be firmware (e.g., a discrete logic component) that performs one or more data computation procedures or processes.

In some embodiments, the processor includes one or more processors, controllers, microprocessors, microcontrollers, application-specific integrated circuits (ASICs), digital signal processors, programmable logic devices, field programmable gate arrays, any combination of these devices or arrangements, or a combination of other known devices and arrangements to implement functions described below.

In this example, the controller 401 includes a central processing unit (CPU) 402 and a storage 403. The storage 403 includes non-transitory recording media readable by the CPU 402, such as a read-only memory (ROM) and a random-access memory (RAM). The storage 403 stores a control program 403a for controlling the server 40. Various functions of the server 40 are implemented by the CPU 402 executing the control program 403a in the storage 403. In the server 40, the CPU 402 executes the control program 403a to establish the fog P/F 400 as a functional block.

The configuration of the controller 401 is not limited to the above example. For example, the controller 401 may include multiple CPUs 402. The controller 401 may also include at least one digital signal processor (DSP). All functions of the controller 401 or some functions of the controller 401 may be implemented by a hardware circuit that can implement the functions without software. The storage 403 may also include a non-transitory computer-readable recording medium other than a ROM and a RAM. For example, the storage 403 may include a small hard disk drive and a solid-state drive (SSD).

The communication unit 405 can communicate with the cloud server 10 through the firewall. The communication unit 405 may be connected to the firewall using at least one of wired or wireless connections. The communication unit 405 can also communicate with the on-premises system 5 and the cloud servers 11 and 12 through the system I/F 20. The communication unit 406 can communicate with the multiple device GWs 41. The communication unit 406 may be connected to the multiple device GWs 41 using at least one of wired or wireless connections. The communication units 405 and 406 are also communication circuits.

The configuration of the server 40 is not limited to the above example. For example, the server 40 may include a display controlled by the controller 401. The server 40 may also include an operation unit that receives a user operation. The operation unit may include a mouse, a keyboard, and a touchscreen.

As shown in FIG. 5, the device GW 41 includes a controller 411, a communication unit 415, and a device I/F 416. The controller 411 can control the other components of the device GW 41 to centrally manage the operation of the device GW 41. As described in more detail below, the controller 411 includes at least one processor to provide control and processing capabilities for implementing various functions. The processor included in the controller 411 is the same as the processor included in the controller 401 in the server 40 described above.

In this example, the controller 411 includes a CPU 412 and a storage 413. The storage 413 includes a non-transitory recording medium readable by the CPU 412, such as a ROM or a RAM. The storage 413 stores a control program 413a for controlling the device GW 41. Various functions of the device GW 41 are implemented by the CPU 412 executing the control program 413a in the storage 413.

The configuration of the controller 411 is not limited to the above example. For example, the controller 411 may include multiple CPUs 412. The controller 411 may also include at least one DSP. All functions of the controller 411 or some functions of the controller 411 may be implemented by a hardware circuit that can implement the functions without software. The storage 413 may also include a non-transitory computer-readable recording medium other than a ROM and a RAM.

The communication unit 415 can communicate with the communication unit 406 in the server 40. The device I/F 416 is connected with at least one device 42. The controller 411 can receive, through the device I/F 416, the information 420 obtained by the device 42. The controller 411 may also control the device 42 through the device I/F 416. The device I/F 416 is also a device I/F circuit.

The configuration of the device GW 41 is not limited to the above example. For example, the device GW 41 may include a display controlled by the controller 411. The device GW 41 may also include an operation unit that receives a user operation.

Example Configuration of Cloud Server

Figure 6:
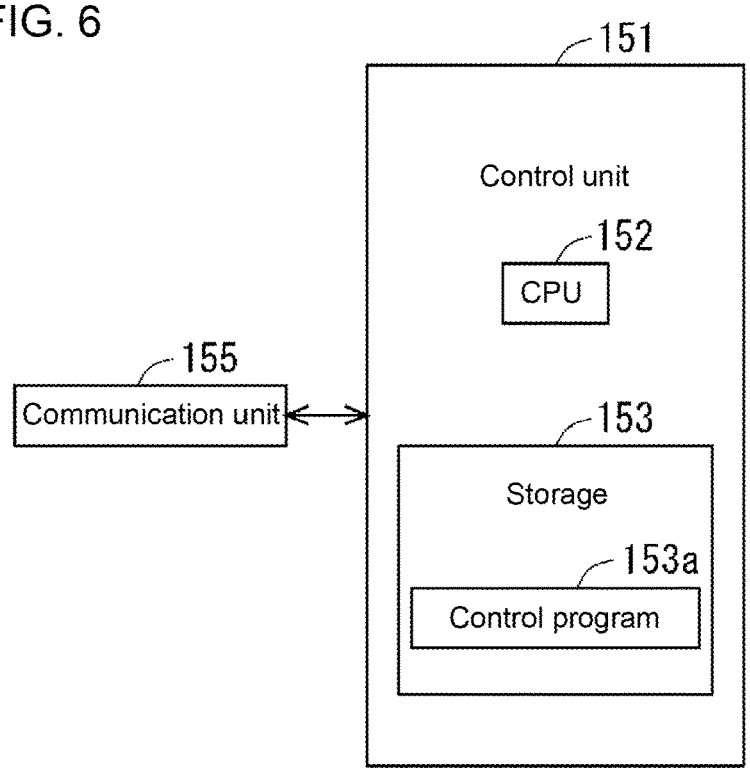
FIG. 6 illustrates a block diagram of a cloud server showing an example configuration.

The example configuration of the cloud servers 10, 11, and 12 will now be described. For example, the cloud servers 10, 11, and 12 have the same hardware configuration. FIG. 6 is a block diagram of the cloud servers 10, 11, and 12 showing an example configuration.

As shown in FIG. 6, the cloud servers 10, 11, and 12 each include a controller 151 and a communication unit 155. The controller 151 can control the other components of the cloud server to centrally manage the operation of the cloud server. As described in more detail below, the controller 151 includes at least one processor to provide control and processing capabilities for implementing various functions. The processor included in the controller 151 is the same as the processor included in the controller 401 in the server 40 described above.

In this example, the controller 151 includes a CPU 152 and a storage 153. The storage 153 has larger memory capacity than, for example, the storage 403 in the server 40 in any plant system 4. The storage 153 includes a non-transitory recording medium readable by the CPU 152, such as a ROM or a RAM. The storage 153 stores a control program 153a for controlling the cloud server. Various functions of the cloud server are implemented by the CPU 152 executing the control program 153a in the storage 153. In the cloud server 10, the CPU 152 executes the control program 153a to establish the cloud P/F 100 as a functional block. In the cloud server 11, the CPU 152 executes the control program 153a to establish the cloud P/F 110. In the cloud server 12, the CPU 152 executes the control program 153a to establish the cloud P/F 120.

The configuration of the controller 151 is not limited to the above example. For example, the controller 151 may include multiple CPUs 152. The controller 151 may also include at least one DSP. All functions of the controller 151 or some functions of the controller 151 may be implemented by a hardware circuit that can implement the functions without software. The storage 153 may also include a non-transitory computer-readable recording medium other than a ROM and a RAM.

The communication unit 155 is connected to the Internet. The communication unit 155 can obtain various types of information through the Internet. The communication unit 155 in the cloud server 10 can communicate with at least one of the communication unit 405 in the server 40 or the communication units 415 in the device GWs 41 in each plant system 4 through the firewall. The communication unit 155 in the cloud server 10 can also communicate with the on-premises system 5 through the firewall 15 and the system I/F 20.

The communication units 155 in the cloud servers 11 and 12 are connected to the system I/F 20. The communication units 155 in the cloud servers 11 and 12 can communicate with the communication unit 405 in the server 40 in each intra-plant system 4 and the on-premises system 5 through the system I/F 20. The communication units 155 in the cloud servers 11 and 12 can also communicate with the communication unit 405 in the server 40 in the extra-plant system 4d through the system I/F 20, the server 40 in any intra-plant system 4, the firewall 13, the cloud server 10, and the firewall 14. The communication units 155 in the cloud servers 11 and 12 may communicate with the communication unit 405 in the server 40 in the extra-plant system 4d through the system I/F 20, the firewall 15, the cloud server 10, and the firewall 14.

The communication unit 155 may communicate with a device not included in the information processing system 1. For example, the communication unit 155 may communicate with a server connected to the Internet and providing weather information. In this case, the controller 151 may store weather information received by the communication unit 155 into the storage 153. The communication unit 155 may communicate with a server connected to the Internet and providing business information. In this case, the controller 151 may store business information received by the communication unit 155 into the storage 153.

The configuration of the cloud servers 10, 11, and 12 is not limited to the above example. For example, at least one of the cloud server 10, 11, or 12 may include a display controlled by the controller 151. At least one of the cloud server 10, 11, or 12 may include an operation unit that receives a user operation. At least two of the cloud servers 10, 11, and 12 may have different hardware configurations.

Example Configuration of On-premises System

The example configuration of the on-premises system 5 will now be described. As shown in FIG. 1, the on-premises system 5 includes, for example, a division server 50 installed for each division of the specific corporation. The division server 50 is a computer. The division server 50 manages the production management information, the accounting information, and the technical information in the corresponding division.

Figure 7:
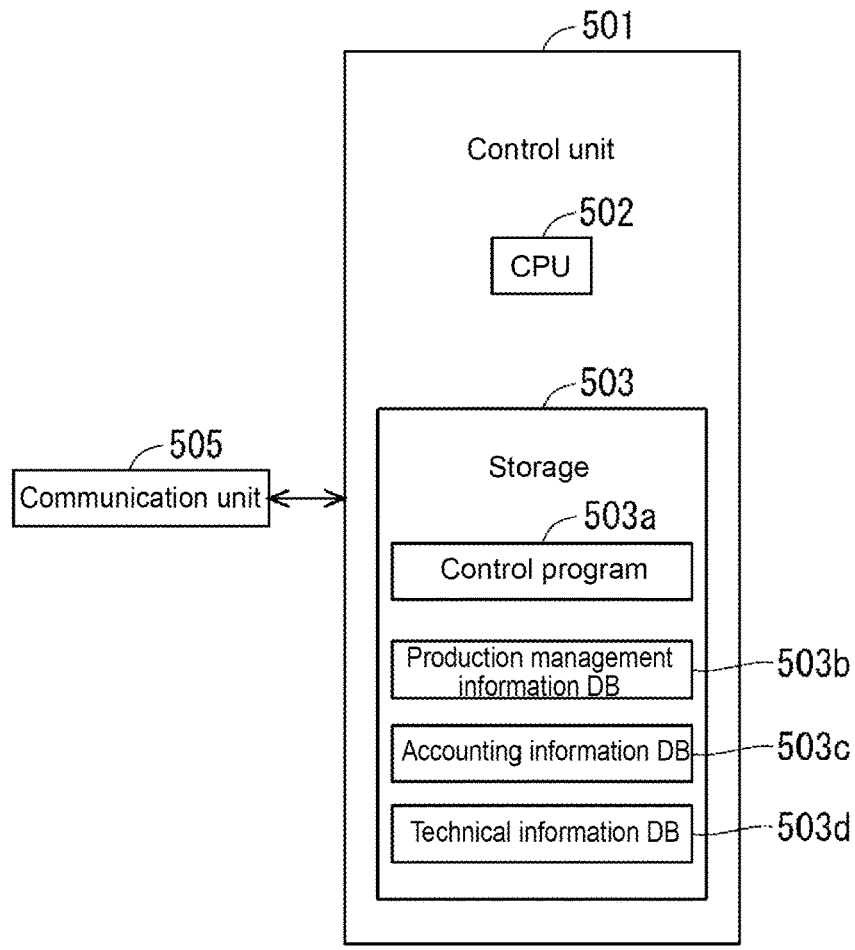
FIG. 7 illustrates a block diagram of a division server showing an example configuration.

FIG. 7 is a block diagram of the division server 50 showing an example configuration. As shown in FIG. 7, the division server 50 includes, for example, a controller 501 and a communication unit 505. The controller 501 can control the other components of the division server 50 to centrally manage the operation of the division server 50. As described in more detail below, the controller 501 includes at least one processor to provide control and processing capabilities for implementing various functions. The processor included in the controller 501 is the same as the processor included in the controller 401 in the server 40 described above.

In this example, the controller 501 includes a CPU 502 and a storage 503. The storage 503 includes a non-transitory recording medium readable by the CPU 502, such as a ROM or a RAM. The storage 503 stores a control program 503a for controlling the division server 50. The storage 503 also includes a production management information DB 503b storing the production management information, an accounting information DB 503c storing the accounting information, and a technical information DB 503d storing the technical information. DB refers to a database. Various functions of the division server 50 are implemented by the CPU 502 executing the control program 503a in the storage 503.

The configuration of the controller 501 is not limited to the above example. For example, the controller 501 may include multiple CPUs 502. The controller 501 may also include at least one DSP. All functions of the controller 501 or some functions of the controller 501 may be implemented by a hardware circuit that can implement the functions without software. The storage 503 may also include a non-transitory computer-readable recording medium other than a ROM and a RAM.

The communication unit 505 is connected to the system I/F 20. The communication unit 505 can communicate with the cloud P/Fs 100, 110, and 120 and the fog P/F 400 in each plant system 4 through the system I/F 20.

The configuration of the division server 50 is not limited to the above example. For example, the division server 50 may include a display controlled by the controller 501. The division server 50 may also include an operation unit that receives a user operation.

The on-premises system 5 includes, in addition to the division servers 50, a computer 51 including a machine learning engine 510 and a computer 52 including a statistical analysis engine 520. For example, the computers 51 and 52 have the hardware configuration similar to the hardware configuration of the division servers 50. In the computer 51, the CPU executes the control program in the storage to establish the machine learning engine 510 as a functional block. The machine learning engine 510 has different performance from the machine learning engines 101 and 111 outside the intranet 2. In the computer 52, the CPU executes the control program in the storage to establish the statistical analysis engine 520 as a functional block. For example, the statistical analysis engine 520 can perform regression analysis. The statistical analysis engine 520 has different performance from the statistical analysis engine 121 outside the intranet 2.

At least one of the computer 51 or 52 may have hardware configuration different from the hardware configuration of the division server 50. The machine learning engine 510 and the statistical analysis engine 520 may be installed in one computer. Unlike in the example in FIG. 1 in which each division owns a server, one server may manage the information in the divisions. The on-premises system 5 may also include one server that collectively manages information from all the divisions of the specific corporation.

The machine learning engines 101, 111, and 510 may each be referred to as the machine learning engine, unless they are distinguished. The statistical analysis engines 121 and 520 may each be referred to as the statistical analysis engine, unless they are distinguished.

In this example described above, the information processing system 3 in the intranet 2 and the plant-D system 4d outside the intranet 2 can communicate with each other through the cloud server 10. The plant-D system 4d is not to be incorporated in the intranet 2. Thus, the cloud server 10 facilitates the establishment of the information processing system 1 in which the information processing system 3 can communicate with the plant-D system 4d. Operation Examples of Information Processing System Various operation examples of the information processing system 1 will now be described.

Operation Example of Plant System

In one plant system 4, the fog P/F 400 can control the destination server for the information 420 obtained by a device GW 41 from a device 42. When receiving, from a device GW 41, the information 420 obtained by the device GW 41 from a device 42, the fog P/F 400 can transmit the received information 420 to, for example, the cloud P/F 100 in the cloud server 10. The fog P/F 400 can also transmit the received information 420 to the cloud P/F 110. The fog P/F 400 can also transmit the received information 420 to the cloud P/F 120. Each of the cloud P/Fs 100, 110, and 120 stores the received information 420 into the storage 153. The fog P/F 400 can transmit the information 420 from a device GW 41 to the on-premises system 5. In the on-premises system 5, the information 420 from the fog P/F 400 is stored into the storage 503 in the division server 50. More specifically, the information 420 from the fog P/F 400 in the plant system 4 is stored into the technical information DB 503d in the storage 503 in the division server 50 associated with the division owning the plant system 4.

Figure 8:
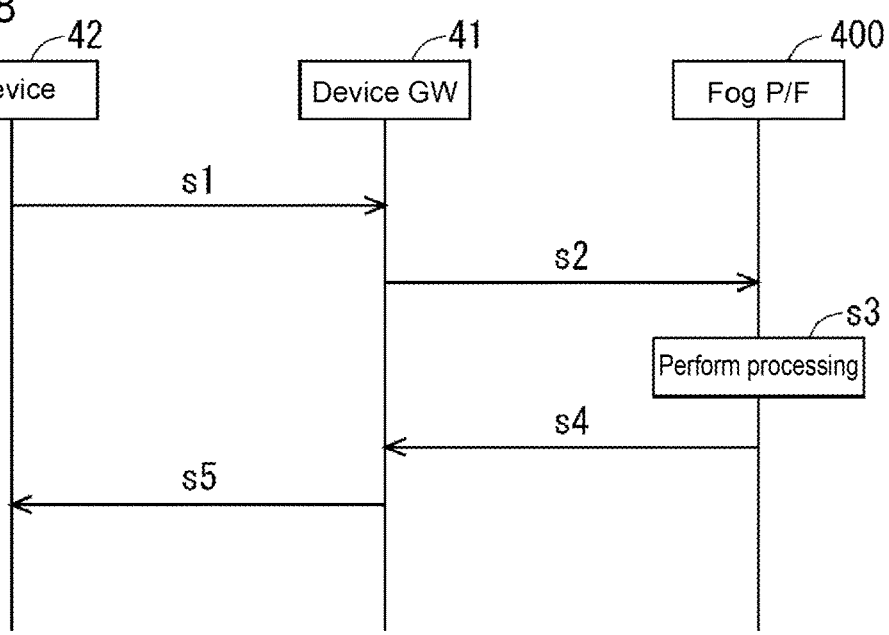
FIG. 8 illustrates a diagram showing an operation example of a plant system.

The fog P/F 400 can perform processing using the information 420 from the device GW 41. For example, the fog P/F 400 can perform simple computation processing. For example, the fog P/F 400 can perform arithmetic operations using the information 420. FIG. 8 is a diagram showing an operation example of one plant system 4.

In step s1, as shown in FIG. 8, the device 42 transmits the information 420 to the device GW 41. In step s2, the device GW 41 transmits the information 420 to the fog P/F 400. In step s3, the fog P/F 400 performs processing using the information 420. In accordance with the result from the processing, the fog P/F 400 generates information to be transmitted to the device GW 41. In step s4, the fog P/F 400 transmits the generated information to the device GW 41. In step s5, the device GW 41 controls the device 42 based on the received information. The device 42 that transmits the information 420 in step s1 may be the same as or different from the device 42 controlled in step s5.

In one example, the device 42 that transmits the information 420 in step s1 may be a current sensor. In step s3, for example, the fog P/F 400 determines whether the current (information 420) obtained from the current sensor has increased continuously for at least a predetermined time. When the current obtained from the current sensor has increased continuously for at least the predetermined time, the fog P/F 400 transmits instruction information in step s4 to the device GW 41 for outputting an alarm. In step s5, the device GW 41 that has received the instruction information outputs an alarm by, for example, sounding the buzzer (device 42) connected to the device GW 41. A device GW 41 with a display may indicate the alarm information on the display.

In another example, the fog P/F 400 may prestore a predetermined relational expression representing the relation between the information 420 and other information. In this case, the fog P/F 400 may determine the other information based on the stored relational expression and the input information 420. For example, the plant system 4 may perform processing that controls the flow rate of wastewater into a treatment bath in accordance with the water level of the wastewater in the treatment bath of a wastewater treatment system installed in a plant. The fog P/F 400 in this example stores the relational expression representing the relationship between the water level of the wastewater in the treatment bath and the set value of the corresponding flow rate of wastewater. In step s3, the fog P/F 400 determines the set value of the flow rate of wastewater based on the relational expression and the water level of the wastewater in the treatment bath (information 420) transmitted in step s2 by the device GW 41. In step s4, the fog P/F 400 provides the determined set value to the device GW 41. In step s5, the device GW 41 sets the received set value to the PLC 42b.

The PLC 42b is connected with a flow sensor that determines the flow rate of wastewater. The PLC 42b can control the opening degree of a valve that regulates the flow rate of wastewater. The PLC 42b controls the opening degree of the valve to regulate the flow rate determined by the flow sensor to the set value.

In another example, the plant system 4 may perform printing using an industrial inkjet printer. The fog P/F 400 stores a relational expression representing the relationship between a deviation at a print position and an offset for the inkjet head position for correcting the deviation. The multiple devices 42 in this example include a sensor that determines the deviation in print position. In step s3, the fog P/F 400 determines the offset based on the relational expression and the deviation at a print position (information 420) transmitted by the device GW 41. In step s4, the fog P/F 400 provides the determined offset to the device GW 41. In step s5, the device GW 41 sets the received offset to the PLC 42b that controls the inkjet printer. The PLC 42b controls the inkjet printer to shift the inkjet head by the set offset.

For the information 420 that is an image captured by a camera, the fog P/F 400 may perform simple image processing on the captured image. For example, the fog P/F 400 may reduce the size of the captured image.

In this manner, the fog P/F 400 can perform a certain degree of processing using the information 420. The fog P/F 400 thus reduces the processing burden on the cloud P/F 100. The fog P/F 400 also reduces the amount of information transmitted from the intranet 2 to the cloud P/F 100. Moreover, the fog P/F 400 on the edge nearer the devices 42 performs processing, thus improving the real-time responsiveness in the processing.

The fog P/F 400 may store the control program 413a for the device GWs 41 to be controlled. In this case, when a device GW 41 is replaced with a new device GW 41 after an event such as a failure, the fog P/F 400 may write the control program 413a into the new device GW 41. This enables the new device GW 41 to operate appropriately. The device GWs 41 can thus be replaced easily.

Information Sharing Among Fog P/Fs

In this example, a P/F similar to the fog P/F 400 that controls the device GWs 41a in the plant-D system 4d is established in the cloud P/F 100. For ease of explanation, the P/F similar to the fog P/F 400 and established in the cloud P/F 100 may be referred to as the cloud fog P/F 400.

The cloud fog P/F 400 is connected to the device GWs 41a in the plant-D system 4d through the firewall 14. The cloud fog P/F 400 manages the system including the device GWs 41a in the plant-D system 4d, the devices 42 connected to them, and the cloud fog P/F 400. The cloud fog P/F 400 operates in the same manner as the fog P/F 400 in a plant system 4. For example, the cloud fog P/F 400 can control the devices 42 connected to the device GWs 41a based on the information 420 from the device GWs 41a. The cloud fog P/F 400 tracks the status of the system that it manages. Examples of the status of the system tracked by the cloud fog P/F 400 include the types of the device GWs 41 connected to the cloud fog P/F 400, and the types of the operations performed by the device GWs 41. Examples of the status of the system tracked by the cloud fog P/F 400 also include the types of the devices 42 connected to the device GWs 41, which are connected to the cloud fog P/F 400, and the types of the operations performed by the devices 42. In the plant-D system 4d including the device GWs 41a, the fog P/F 400 manages the system including the fog P/F 400, the device GWs 41 connected to it, and the devices 42 connected to the device GWs 41. Unless otherwise specified, the fog P/F 400 may also refer to the cloud fog P/F 400.

The information processing system 1 in this example uses the container technology, and the multiple fogs P/F 400 virtually form a single P/F. Each fog P/F 400 tracks not only the status of the system that it manages, but also the statuses of the systems managed by the other fog P/Fs 400. In other words, each fog P/F 400 stores not only the system status information indicating the status of the system that it manages, but also the system status information indicating the statuses of the systems managed by the other fog P/Fs 400.

For example, the fog P/F 400 in the plant-A system 4*a* stores not only the system status information indicating the status of the plant-A system 4*a*, but also the system status information indicating the status of the system managed by the fog P/F 400 in the plant-B system 4*b*, or the status of the plant-B system 4*b*. The fog P/F 400 in the plant-A system 4*a* also stores the system status information indicating the status of the plant-C system 4*c*. The fog P/F 400 in the plant-A system 4*a* also stores the system status information indicating the status of the system managed by the fog P/F 400 in the plant-D system 4*d*. The fog P/F 400 in the plant-A system 4*a* also stores the system status information indicating the status of the system managed by the cloud fog P/F 400. Similarly, each fog P/F 400 other than the fog P/F 400 in the plant-A system 4*a* stores the system status information about the systems managed by the other fog P/Fs 400.

The fog P/F 400 in each plant system 4 can provide information indicating the status of the system that it manages to the fog P/Fs 400 in the other plant systems 4 through the cloud fog P/F 400. More specifically, in response to a change in the status of the system managed by the fog P/F 400 in each plant system 4, the fog P/F 400 can provide information indicating the change to, for example, the fog P/Fs 400 in the other plant systems 4 through the cloud fog P/F 400. The cloud fog P/F 400 can also provide information indicating the status of the system that it manages to the fog P/F 400 in each plant system 4. More specifically, in response to a change in the status of the system managed by the cloud fog P/F 400, the cloud fog P/F 400 can provide information indicating the change to the fog P/F 400 in each plant system 4. An operation example of the information processing system 1 in which information indicating the status of the system managed by the fog P/F 400 is provided to the other fog P/Fs 400 will now be described in detail.

In response to a change in the status of the system managed by the fog P/F 400 in each plant system 4, the fog P/F 400 provides system change information indicating the change to the cloud fog P/F 400. For example, when a new item is added to the rules of the fog P/F 400, information identifying the item is included in the system change information. When a new sensor is added to the system, information about the new sensor is included in the system change information. When an abnormality occurs in the system managed by the fog P/F 400, information identifying the abnormality is included in the system change information. For example, when the sensor 42*a* fails and is no longer operable, information indicating that the sensor 42*a* is not operating is included in the system change information. The fog P/F 400 that transmits the system change information may be hereafter referred to as the target fog P/F 400.

When receiving system change information from the target fog P/F 400 in a plant system 4, the cloud fog P/F 400 updates, based on the received system change information, the system status information stored in it about the system managed by the target fog P/F 400. In this manner, the cloud fog P/F 400 tracks the latest status of the system managed by the target fog P/F 400. The cloud fog P/F 400 receives system change information from the target fog P/F 400 in a plant system 4 and provides the information to the fog P/Fs 400 in the other plant systems 4. Based on the received system change information, the fog P/Fs 400 in the other plant systems 4 update the system status information about the system managed by the target fog P/F 400. In response to a change in the status of the system managed by the cloud fog P/F 400, the cloud fog P/F 400 provides system change information indicating the change to the fog P/F 400 in each plant system 4. Based on the received system change information, the fog P/F 400 in each plant system 4 updates the system status information about the system managed by the cloud fog P/F 400. In this manner, the fog P/F 400 in each plant system 4 tracks the latest statuses of the systems managed by the other fog P/Fs 400.

The installation of the information processing system 1 involves writing, in each fog P/F 400, system status information that indicates the initial statuses of the systems managed by the other fog P/Fs 400. Each fog P/F 400 updates the system status information written during the system installation in an appropriate manner as described above to track the latest statuses of the systems managed by the other fog P/Fs 400.

In this example described above, each fog P/F 400 tracks the statuses of the systems managed by the other fog P/Fs 400. This enables the fog P/F 400 to perform processing in accordance with the statuses of the systems managed by the other fog P/Fs 400.

For example, when an abnormality occurs in the system managed by a fog P/F 400, another fog P/F 400 can perform processing that responds to the abnormality. In one example, plant C is a plant without workers, whereas plant B is a plant with workers. When the fog P/F 400 in the plant-B system 4*b* detects an abnormality in the plant-C system 4*c* based on the system status information about the plant-C system 4*c*, the fog P/F 400 controls the device GWs 41 in the plant-B system 4*b* to activate the lamp and the buzzer connected to the device GWs 41. This allows workers in plant B to be notified of the abnormality in the plant-C system 4*c* installed in plant C without workers. When the cloud fog P/F 400 detects an abnormality in the plant-C system 4*c* based on the system status information about the plant-C system 4*c*, the cloud fog P/F 400 may provide information indicating the abnormality in the plant-C system 4*c* to a management server that belongs to the specific corporation and manages the information processing system 1. The management server is, for example, included in the on-premises system 5.

Each fog P/F 400 tracks the statuses of the systems managed by the other fog P/Fs 400. Thus, when a fog P/F 400 stops due to, for example, a failure, another fog P/F 400 may operate in place of the fog P/F 400 that has stopped.

When the server 40 in a plant system 4 is replaced with a new server 40, the fog P/F 400 in another plant system 4 or the cloud fog P/F 400 provides, to the fog P/F 400 in the new server 40, information indicating the status of the system to be managed by the fog P/F 400 in the new server 40. This enables the fog P/F 400 in the new server 40 to operate appropriately. The server 40 in any plant system 4 can thus be replaced easily.

The cloud fog P/F 400 may refer to the system status information about a plant system 4 to access the rules of the fog P/F 400 in the plant system 4. The cloud fog P/F 400 can thus determine an abnormality in the operation of the fog P/F 400 in the plant system 4.

For example, a fog P/F 400 may have the rule that the fog P/F 400 transmits the information 420 to the cloud P/F 100 every five minutes. In this case, when the fog P/F 400 does not transmit the information 420 to the cloud P/F 100 for at least ten minutes, the cloud fog P/F 400 determines that the fog P/F 400 has an abnormality. When determining that the fog P/F 400 in a plant system 4 has an abnormality, the cloud fog P/F 400 provides, for example, information indicating the abnormality in the fog P/F 400 to the management server in the on-premises system 5. The management server notifies the operator of the abnormality in the fog P/F 400 through, for example, an indication on the display. The cloud fog P/F 400 may determine an abnormality in the fog P/F 400 in a plant system 4 in other manners. The cloud fog P/F 400 may also operate in other manners after detecting an abnormality in the fog P/F 400 in a plant system 4.

Operation Examples of Machine Learning Engine and Statistical Analysis Engine

The machine learning engine 101 in the cloud P/F 100 can generate a trained model based on, for example, information in the storage 153 in the cloud server 10. More specifically, the machine learning engine 101 can train a learning model using the information in the storage 153 in the cloud server 10 as training data. The machine learning engine 101 can infer predetermined information based on the trained model and the information in the storage 153 in the cloud server 10. In the machine learning engine 101, the trained model provides an output as an inference in response to the input of the information in the storage 153 into the trained model. The information in the storage 153 in the cloud server 10 may be referred to as first cloud information. The trained model generated in the machine learning engine 101 may be referred to as a first cloud trained model.

The machine learning engine 111 in the cloud P/F 110 can generate a trained model based on, for example, information in the storage 153 in the cloud server 11. The machine learning engine 111 can also infer predetermined information based on the trained model and the information in the storage 153 in the cloud server 11. The information in the storage 153 in the cloud server 11 may be referred to as second cloud information. The trained model generated in the machine learning engine 111 may be referred to as a second cloud trained model.

The machine learning engine 510 in the on-premises system 5 can generate a trained model based on, for example, information in the storage 503 in a division server 50. More specifically, the machine learning engine 510 can train a learning model using the information in the storage 503 as training data. The machine learning engine 510 can infer predetermined information based on the trained model and the information in the storage 503 in the division server 50. In the machine learning engine 510, when the information in the storage 503 is input into the trained model, the trained model provides an output as an inference. The information in the storage 503 in a division server 50 may be referred to as on-premises information. The trained model generated in the machine learning engine 510 may be referred to as an on-premises trained model.

When the first cloud information is updated, the machine learning engine 101 may train the first cloud trained model again based on the updated first cloud information. Similarly, when the second cloud information is updated, the machine learning engine 111 may train the second cloud trained model again based on the updated second cloud information. When the on-premises information is updated, the machine learning engine 510 may train the on-premises trained model again based on the updated on-premises information.

For example, the statistical analysis engine 121 in the cloud P/F 120 can statistically analyze information in the storage 153 in the cloud server 12 to generate a statistical analysis model that outputs predetermined information. The statistical analysis engine 121 can also input the information in the storage 153 in the cloud server 12 into the generated statistical analysis model to obtain the predetermined information. The information in the storage 153 in the cloud server 12 may be referred to as third cloud information. The statistical analysis model generated in the statistical analysis engine 121 may be referred to as a cloud statistical analysis model.

For example, the statistical analysis engine 520 in the on-premises system 5 can statistically analyze the on-premises information to generate a statistical analysis model that outputs predetermined information. The statistical analysis engine 520 can also input the on-premises information into the generated statistical analysis model to obtain the predetermined information. The statistical analysis model generated in the statistical analysis engine 520 may be referred to as an on-premises statistical analysis model.

When the third cloud information is updated, the statistical analysis engine 121 may form a cloud statistical analysis model again based on the updated third cloud information. Similarly, when the on-premises information is updated, the statistical analysis engine 520 may form an on-premises statistical analysis model again based on the updated on-premises information.

In the information processing system 1 in this example, information obtained through statistical analysis is generated by using a statistical analysis engine. Information difficult to obtain through statistical analysis is generated by using a machine learning engine.

In the information processing system 1 in this example, information to be inferred by a machine learning engine is determined in accordance with the performance of the machine learning engine. Information to be output by a statistical analysis engine is determined in accordance with the performance of the statistical analysis engine.

Specific operation examples of the machine learning engine and the statistical analysis engine will now be described. In the example described below, the machine learning engine and the statistical analysis engine are used for wastewater treatment systems in plants.

Plants A to D each have a wastewater treatment system that purifies and drains wastewater generated in the plant. For example, the wastewater treatment system includes an adjustment bath for adjusting the pH of the wastewater and a separation bath for separating the wastewater. The wastewater treatment system may include a single treatment bath that adjusts the pH of the wastewater and separates the wastewater.

The adjustment bath receives an adjusting agent for adjusting the pH. The separation bath receives a separating agent. In this example, for example, the amount of adjusting agent to be placed is calculated by using the statistical analysis engine. The amount of separating agent to be placed is estimated by using the machine learning engine. A method of determining the amounts of adjusting agent and separating agent will now be described by using the wastewater treatment system in plant A as an example. This is also applicable to the wastewater treatment systems in plants B to D.

Example Method for Determining Amount of Adjusting Agent

The multiple devices 42 in the plant-A system 4a include a pH sensor that determines the pH of the wastewater in the adjustment bath. The pH sensor determines the pH repeatedly and outputs the determined values. The multiple devices 42 in the plant-A system 4a also include a temperature sensor that determines the temperature of the wastewater in the adjustment bath. The temperature sensor determines the temperature repeatedly and outputs the determined values. The multiple devices 42 in the plant-A system 4a also include a PLC that controls an adjustor placement device for automatically placing an adjusting agent into the adjustment bath. The pH determined by the pH sensor may be referred to as determined pH. The temperatures determined by the temperature sensor may be referred to as determined temperatures.

The effectiveness of the adjusting agent used in the wastewater depends on the temperature of the wastewater. For example, as the temperature of the wastewater increases, the effectiveness of the adjusting agent is higher. In this example, the statistical analysis engine, at the stage of statistical model generation, statistically analyzes the determined pH, the determined temperatures, and the corresponding amount (predetermined value) of the adjusting agent to generate a statistical analysis model that outputs a suitable amount of adjusting agent to be placed. The statistical analysis engine uses the generated statistical analysis model to determine the amount of adjusting agent. More specifically, the statistical analysis engine inputs the determined pH and the determined temperatures into the statistical analysis model, and determines the output information from the statistical analysis model as the amount of adjusting agent to be placed. When the amount of adjusting agent to be placed is determined, the fog P/F 400 in the plant-A system 4a provides information indicating the determined amount to the device GW 41, which is connected to the PLC that controls the adjustor placement device. The device GW 41 sets the received amount to the PLC 42b that controls the adjustor placement device. The PLC 42b controls the adjustor placement device to place the adjusting agent into the adjustment bath by the set amount.

The amount of adjusting agent to be placed may be determined by the statistical analysis engine 520 in the on-premises system 5. In this case, the fog P/F 400 in the plant-A system 4a transmits the determined pH and the determined temperatures received from the device GW 41 to the on-premises system 5. In the on-premises system 5, the determined pH and the determined temperatures are stored into the technical information DB 503d in the division server 50 associated with the division owning plant A. The statistical analysis engine 520, at the stage of statistical model generation, reads the determined pH and the determined temperatures from the technical information DB 503d. The statistical analysis engine 520 then statistically analyzes the read determined pH and determined temperatures, and the corresponding amount of adjusting agent to generate a statistical analysis model that outputs a suitable amount of adjusting agent. In this manner, the statistical analysis model for plant A is generated.

After the statistical analysis model is generated, the statistical analysis engine 520 inputs the latest determined pH and determined temperature from the technical information DB 503d into the statistical analysis model to determine the amount of adjusting agent to be placed. The information indicating the amount of adjusting agent to be placed determined in the statistical analysis engine 520 is provided to the fog P/F 400 in the plant-A system 4a. The fog P/F 400 sets the amount of adjusting agent to be placed to the PLC 42b through the device GW 41. The adjusting agent is then placed into the adjustment bath by the amount determined in the statistical analysis engine 520. The statistical analysis engine 520 may form a statistical analysis model again automatically based on the determined pH and the determined temperatures in the technical information DB 503d.

When the statistical analysis engine 520 determines the amounts of the individual adjusting agents to be placed for plants A to D, the statistical analysis engine 520 generates a statistical analysis model for plant A, a statistical analysis model for plant B, a statistical analysis model for plant C, and a statistical analysis model for plant D.

The determined pH and the determined temperatures obtained in the plant-D system 4d outside the intranet 2 are input into the on-premises system 5 through the cloud server 10. In some embodiments, the determined pH and the determined temperatures obtained in the plant-D system 4d may be input into the on-premises system 5 through the firewall 14, the cloud server 10, the firewall 15, and the system I/F 20. In other embodiments, the determined pH and the determined temperatures obtained in the plant-D system 4d may be input into the on-premises system 5 through the firewall 14, the cloud server 10, the firewall 13, the fog P/F 400 in an intra-plant system 4, and the system I/F 20. In some embodiments, the amount for plant D determined by the statistical analysis engine 520 in the on-premises system 5 may be input into the fog P/F 400 in the plant-D system 4d through the system I/F 20, the firewall 15, the cloud server 10, and the firewall 14. In other embodiments, the amount for plant D determined by the statistical analysis engine 520 may be input into the fog P/F 400 in the plant-D system 4d through the system I/F 20, the fog P/F 400 in an intra-plant system 4, the firewall 13, the cloud server 10, and the firewall 14. The plant-D system 4d and the on-premises system 5 exchange other information in the same manner.

Figure 9:
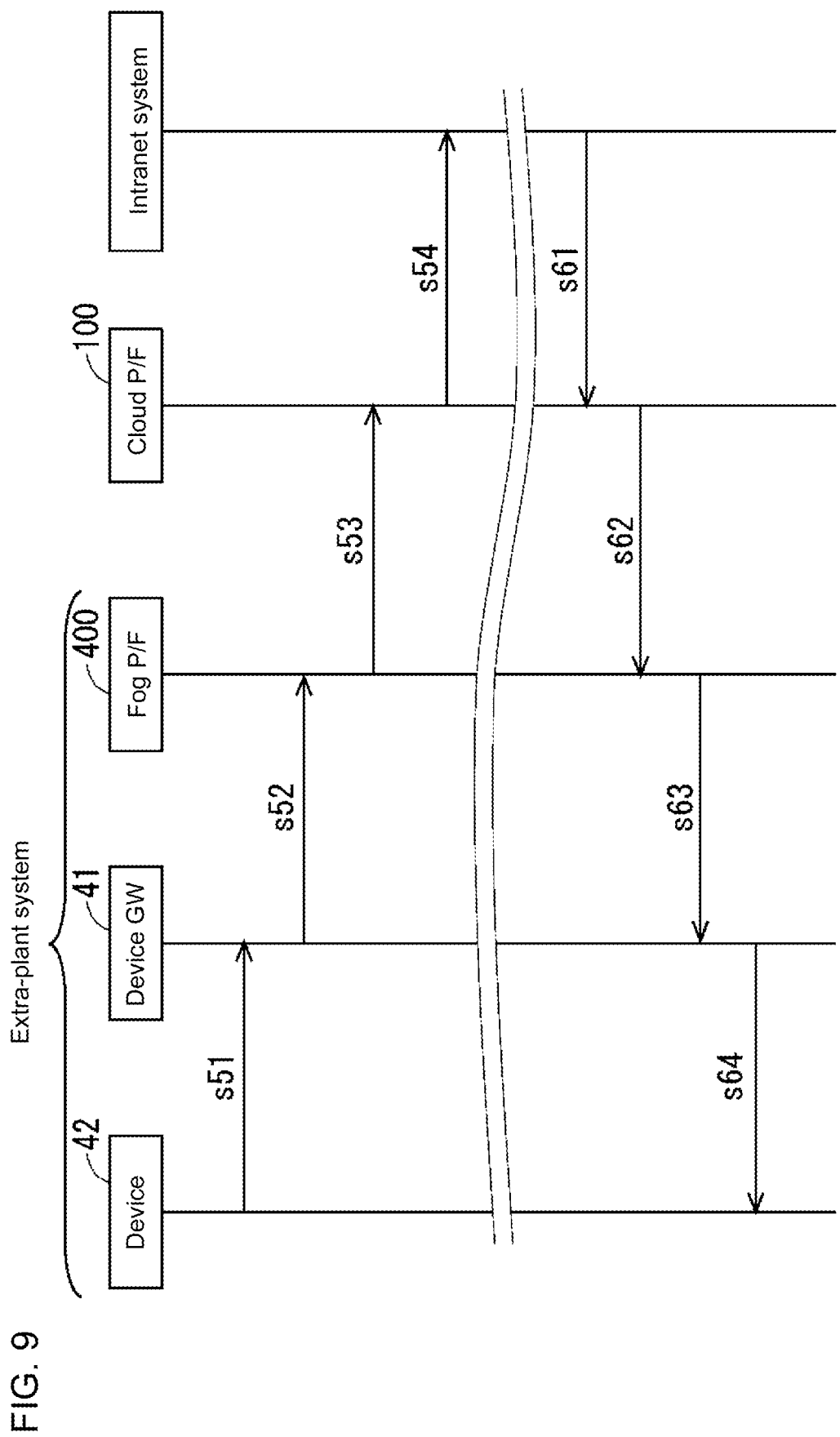
FIG. 9 illustrates a diagram showing an operation example of the information processing system.

FIG. 9 is a diagram of a process in which the amount of adjusting agent to be placed for plant D is determined by the statistical analysis engine 520 in the intranet 2, schematically showing the passage of information between the plant-D system 4d and the statistical analysis engine 520. As shown in FIG. 9, in step s51, the pH sensor and the temperature sensor in the plant-D system 4d output the determined pH and the determined temperatures to the device GW 41. In step s52, the device GW 41 outputs the determined pH and the determined temperatures to the fog P/F 400. In step s53, the fog P/F 400 outputs the determined pH and the determined temperatures to the cloud P/F 100. In step s54, the cloud P/F 100 outputs the determined pH and the determined temperatures. The on-premises system 5 in the intranet 2 receives the determined pH and the determined temperatures output from the cloud P/F 100. In the on-premises system 5, the statistical analysis engine 520 receives the determined pH and the determined temperatures. The statistical analysis engine 520 determines the amount of adjusting agent to be placed using the statistical analysis model, and then outputs the determined amount in step s61. The cloud P/F 100 receives the amount output from the statistical analysis engine 520. In step s62, the cloud P/F 100 outputs the amount to the fog P/F 400 in the plant-D system 4d. In step s63, the fog P/F 400 outputs the amount to the device GW 41. In step s64, the device GW 41 sets the amount to the PLC 42b that controls the adjustor placement device.

The amount of adjusting agent to be placed may be determined by the statistical analysis engine 121 in the cloud server 12. In this case, the fog P/F 400 in the plant-A system 4*a* transmits the determined pH and the determined temperatures received from the device GW 41 to the cloud P/F 120. The cloud P/F 120 stores the received determined pH and determined temperatures into the storage 153 in the cloud server 12. The statistical analysis engine 121 in the cloud P/F 120, at the stage of statistical model generation, statistically analyzes the determined pH and the determined temperatures in the storage 153, and the corresponding amount of adjusting agent to generate a statistical analysis model that outputs a suitable amount of adjusting agent to be placed. After the statistical analysis model is generated, the statistical analysis engine 121 inputs the latest determined pH and determined temperatures from the storage 153 into the statistical analysis model to determine the amount of adjusting agent to be placed. The information indicating the amount of adjusting agent to be placed determined in the statistical analysis engine 121 is provided to the fog P/F 400 in the plant-A system 4*a*. The fog P/F 400 sets the amount of adjusting agent to be placed through the device GW 41 to the PLC 42*b* that controls the adjustor placement device. The adjusting agent is then placed into the adjustment bath by the amount determined in the statistical analysis engine 520. The statistical analysis engine 121 may form a statistical analysis model again automatically based on the determined pH and the determined temperatures in the storage 153.

Figure 10:
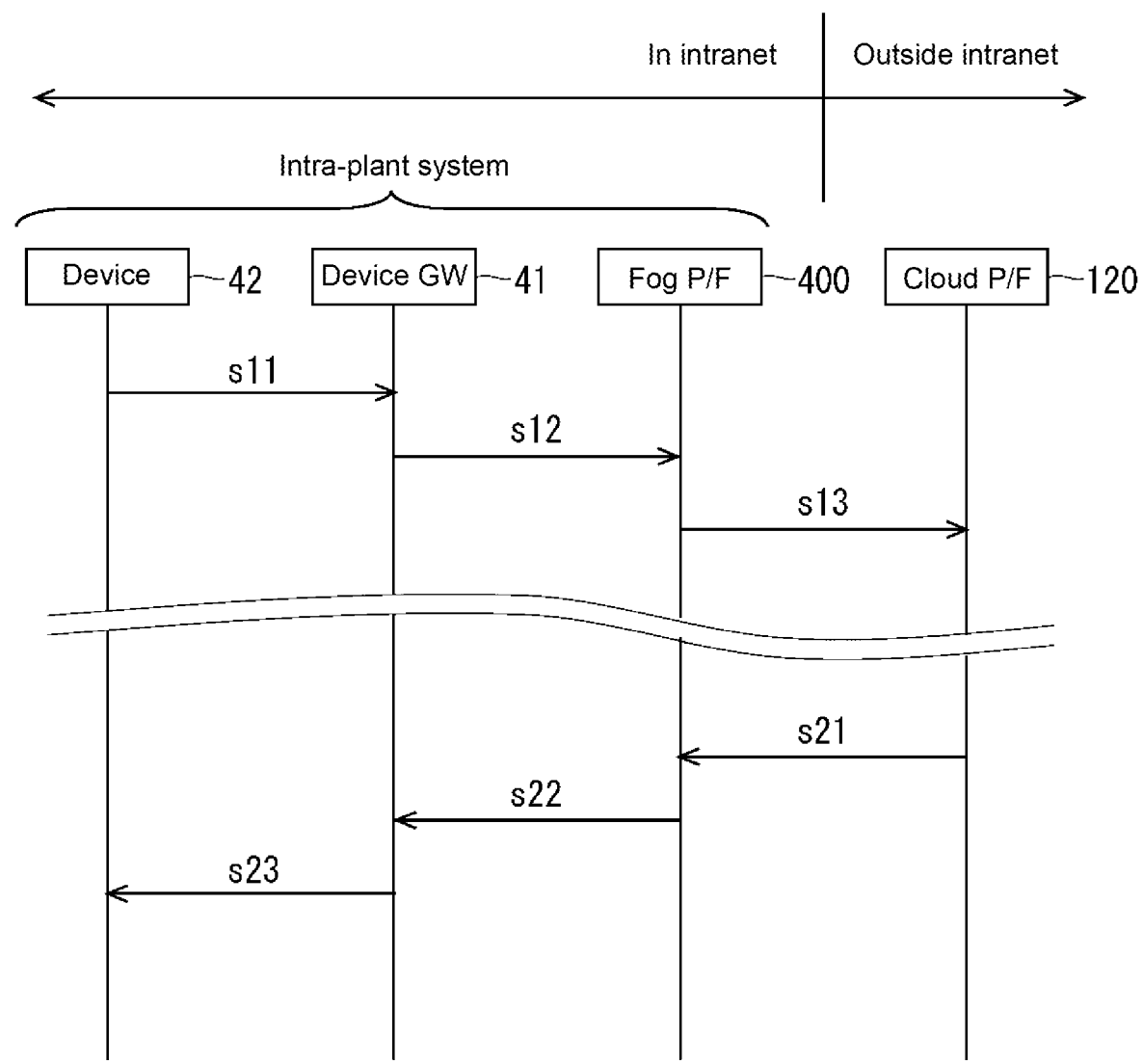
FIG. 10 illustrates a diagram showing an operation example of the information processing system.

FIG. 10 is a diagram of a process in which the amount of adjusting agent to be placed for plant A is determined by the statistical analysis engine 121, schematically showing the passage of information between the plant-A system 4*a* and the cloud P/F 120. As shown in FIG. 10, in step s11, the pH sensor and the temperature sensor in the plant-A system 4*a* output the determined pH and the determined temperatures to the device GW 41. In step s12, the device GW 41 outputs the determined pH and the determined temperatures to the fog P/F 400. In step s13, the fog P/F 400 outputs the determined pH and the determined temperatures to the cloud P/F 120. The cloud P/F 120 stores the determined pH and the determined temperatures. The cloud P/F 120 determines the amount of adjusting agent to be placed using the statistical analysis model, and then outputs the determined amount to the fog P/F 400 in the plant-A system 4*a* in step s21. In step s22, the fog P/F 400 outputs the amount into the device GW 41. In step s23, the device GW 41 sets the amount to the PLC 42*b* that controls the adjustor placement device.

The determined pH and the determined temperatures obtained in the plant-D system 4*d* are input into the cloud server 12 through the cloud server 10. In some embodiments, the determined pH and the determined temperatures obtained in the plant-D system 4*d* may be input into the cloud server 12 through the firewall 14, the cloud server 10, the firewall 15, and the system I/F 20. In other embodiments, the determined pH and the determined temperatures obtained in the plant-D system 4*d* may be input into the cloud server 12 through the firewall 14, the cloud server 10, the firewall 13, the fog P/F 400 in an intra-plant system 4, and the system I/F 20. In some embodiments, the amount for plant D determined by the statistical analysis engine 121 in the cloud server 12 may be input into the fog P/F 400 in the plant-D system 4*d* through the system I/F 20, the firewall 15, the cloud server 10, and the firewall 14. In other embodiments, the amount for plant D determined by the statistical analysis engine 121 may be input into the fog P/F 400 in the plant-D system 4*d* through the system I/F 20, the fog P/F 400 in an intra-plant system 4, the firewall 13, the cloud server 10, and the firewall 14. The plant-D system 4*d* and the cloud server 12 exchange other information in the same manner. The plant-D system 4*d* and the cloud server 11 also exchange information in the same manner.

Figure 11:
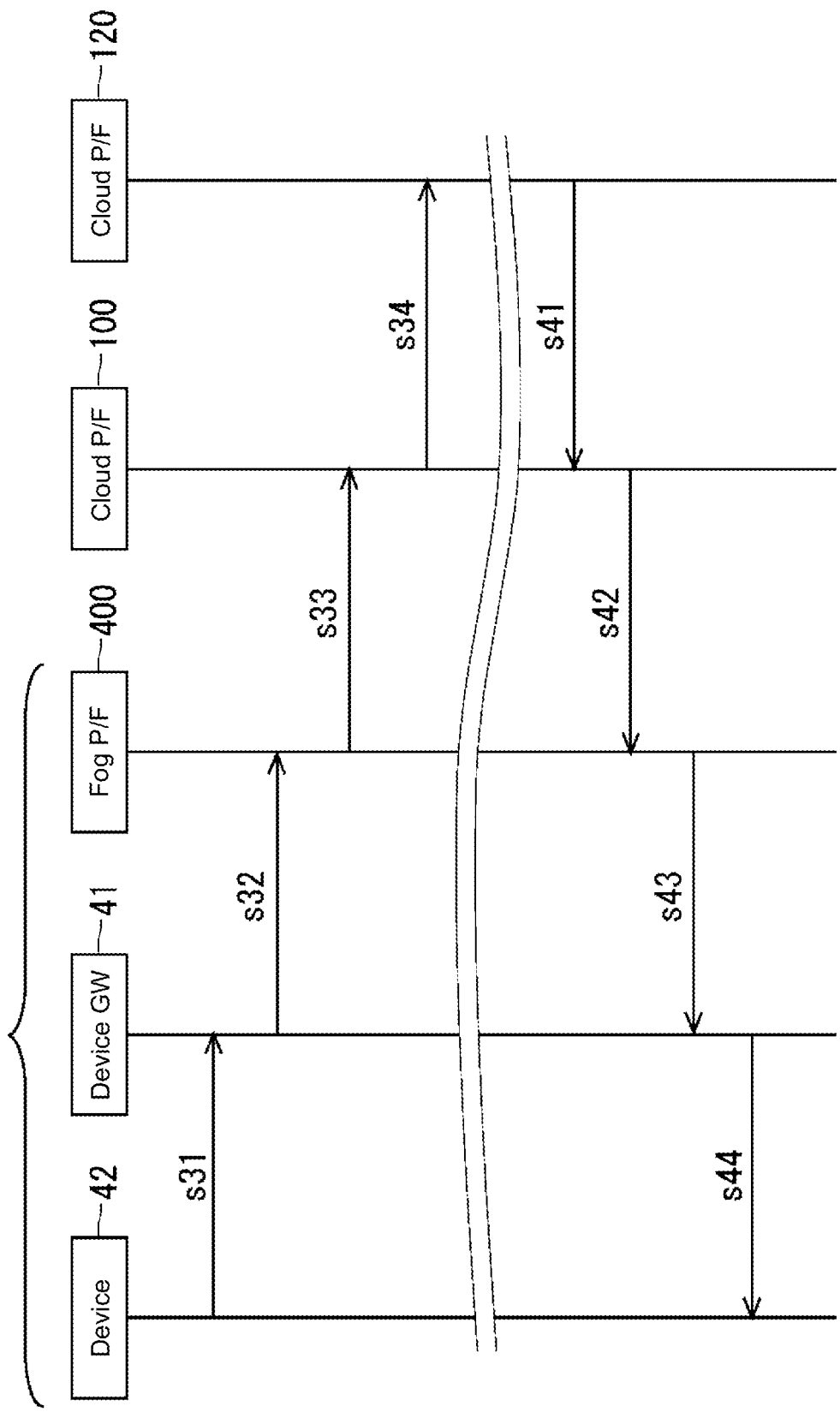
FIG. 11 illustrates a diagram showing an operation example of the information processing system.

FIG. 11 is a diagram of a process in which the amount of adjusting agent to be placed for plant D is determined by the statistical analysis engine 121, schematically showing the passage of information between the plant-D system 4*d* and the cloud P/F 120. As shown in FIG. 11, in step s31, the pH sensor and the temperature sensor in the plant-D system 4*d* output the determined pH and the determined temperatures to the device GW 41. In step s32, the device GW 41 outputs the determined pH and the determined temperatures to the fog P/F 400. In step s33, the fog P/F 400 outputs the determined pH and the determined temperatures to the cloud P/F 100. In step s34, the cloud P/F 100 outputs the determined pH and the determined temperatures. The cloud P/F 120 receives the determined pH and the determined temperatures output from the cloud P/F 100. The cloud P/F 100 stores the determined pH and the determined temperatures. The cloud P/F 120 determines the amount of adjusting agent to be placed using the statistical analysis model, and then outputs the determined amount in step s41. The cloud P/F 100 receives the amount output from the cloud P/F 120. In step s42, the cloud P/F 100 outputs the amount to the fog P/F 400 in the plant-D system 4*d*. In step s43, the fog P/F 400 outputs the amount to the device GW 41. In step s44, the device GW 41 sets the amount to the PLC 42*b* that controls the adjustor placement device.

Example Method of Determining Amount of Separating Agent

The multiple devices 42 in the plant-A system 4*a* include a camera that captures an image of the wastewater in the separation bath. The camera captures images of the wastewater repeatedly and outputs the captured images. The multiple devices 42 in the plant-A system 4*a* also include a PLC that controls a separator placement device for automatically placing a separating agent into the separation bath.

The amount of separating agent to be placed may be determined by a person. In this case, the operator visually checks the wastewater in the separation bath and determines the amount of separating agent to be placed. Similarly to the adjusting agent, the effectiveness of the separating agent depends on the temperature of the wastewater. In this example, the machine learning engine trains, at the training stage, a learning model using the captured images from the camera and the determined temperatures as training data to generate a trained model that outputs the amount of separating agent to be placed. The machine learning engine then uses, at the inference stage, the generated trained model to infer the amount of separating agent to be placed. More specifically, the machine learning engine inputs the captured images and the determined temperatures into the trained model, and determines the output information from the trained model as the amount of separating agent to be placed. When the amount of separating agent to be placed is determined, the fog P/F 400 in the plant-A system 4*a* provides the information indicating the determined amount to the device GW 41, which is connected with the PLC that controls the separator placement device. The device GW 41 sets the received amount to the PLC that controls the separator placement device. The PLC controls the separator placement device to place the separating agent into the separation bath by the set amount.

The amount of separating agent to be placed may be inferred by the machine learning engine 510 in the on-premises system 5. In this case, the fog P/F 400 in the plant-A system 4a transmits the captured images and the determined temperatures received from the device GW 41 to the on-premises system 5. In the on-premises system 5, the captured images and the determined temperatures are stored into the technical information DB 503d in the division server 50 associated with the division owning plant A. The machine learning engine 510 trains, at the training stage, a learning model using the captured images and the determined temperatures in the technical information DB 503d as training data to generate a trained model that outputs the amount of separating agent to be placed. In this manner, the trained model for plant A is generated. After the trained model is generated, the machine learning engine 510 inputs the latest captured image and the determined temperature from the technical information DB 503d into the trained model to determine the amount of separating agent to be placed. The information indicating the amount of separating agent to be placed determined in the machine learning engine 510 is provided to the fog P/F 400 in the plant-A system 4a. The fog P/F 400 sets the amount of separating agent to be placed through the device GW 41 to the PLC 42b that controls the separator placement device. The separating agent is then placed into the separation bath by the amount inferred in the machine learning engine 510. The machine learning engine 510 may train the trained model again automatically based on the captured images and the determined temperatures in the technical information DB 503d.

When the machine learning engine 510 determines the amounts of the individual separating agents to be placed for plants A to D, the machine learning engine 510 generates a trained model for plant A, a trained model for plant B, a trained model for plant C, and a trained model for plant D.

The amount of separating agent to be placed may be inferred by the machine learning engine 101 in the cloud server 10. In this case, the fog P/F 400 in the plant-A system 4a transmits the captured images and the determined temperatures received from the device GW 41 to the cloud P/F 100. The cloud P/F 100 stores the received captured images and determined temperatures into the storage 153 in the cloud server 10. The machine learning engine 101 trains, at the training stage, a learning model using the captured images and the determined temperatures in the storage 153 as training data to generate a trained model that outputs the amount of separating agent to be placed. After the trained model is generated, the machine learning engine 101 inputs the latest captured image and the determined temperature from the storage 153 into the trained model to determine the amount of separating agent to be placed. The information indicating the amount of separating agent to be placed determined in the machine learning engine 101 is provided from the cloud P/F 100 to the fog P/F 400 in the plant-A system 4a. The fog P/F 400 sets the amount of separating agent to be placed through the device GW 41 to the PLC 42b that controls the separator placement device. The separating agent is then placed into the separation bath by the amount inferred in the machine learning engine 101. The machine learning engine 101 may train the trained model again automatically based on the captured images and the determined temperatures in the storage 153.

The amount of separating agent to be placed may also be inferred by the machine learning engine 111 in the cloud server 11. In this case, the fog P/F 400 in the plant-A system 4a transmits the captured images and the determined temperatures received from the device GW 41 to the cloud P/F 110. The cloud P/F 110 stores the received captured images and determined temperatures into the storage 153 in the cloud server 11. The machine learning engine 111 trains, at the training stage, a learning model using the captured images and the determined temperatures in the storage 153 as training data to generate a trained model that outputs the amount of separating agent to be placed. After the trained model is generated, the machine learning engine 111 inputs the latest captured image and the determined temperature from the storage 153 into the trained model to determine the amount of separating agent to be placed. The information indicating the amount of separating agent to be placed determined in the machine learning engine 111 is provided from the cloud P/F 110 to the fog P/F 400 in the plant-A system 4a. The fog P/F 400 sets the amount of separating agent to be placed through the device GW 41 to the PLC 42b that controls the separator placement device. The separating agent is then placed into the separation bath by the amount inferred in the machine learning engine 101. The machine learning engine 111 may train the trained model again automatically based on the captured images and the determined temperatures in the storage 153.

In one example with a single treatment bath that receives the adjusting agent and the separating agent, the machine learning engine may generate a trained model that infers the amount of adjusting agent to be placed and the amount of separating agent to be placed. In this case, the machine learning engine trains, at the training stage, a learning model using the determined pH, the determined temperatures, and the captured images as training data to generate a trained model that outputs the amounts of adjusting agent and separating agent. The machine learning engine, at the inference stage, inputs the determined pH, the determined temperatures, and the captured images into the generated trained model to determine the amounts of adjusting agent and separating agent.

At the training stage, the machine learning engine may train a learning model without the information 420 from the plant system 4. At the stage of statistical analysis model generation, the statistical analysis engine may generate a statistical analysis model without the information 420 from the plant system 4.

The information inferred by the machine learning engine is not limited to the above examples. The information determined by the statistical analysis engine is not limited to the above examples. For example, the machine learning engine may use captured images (information 420) of a substrate produced in a production line to generate a trained model that infers the possibility of an abnormality in the substrate. In another example, the statistical analysis engine may use the consumption of ink per unit time (information 420) and the remaining amount of ink (information 420) to generate a statistical analysis model that outputs the order quantity and timing for ink.

Different machine learning engines may be used to infer different types of information. In this case, the fog P/F 400 in an intra-plant system 4 may determine the destination of the received information 420 depending on the machine learning engine to use the information 420. For example, when the information 420 is used in the machine learning engine 101 in the cloud P/F 100, the fog P/F 400 transmits the information 420 to the cloud P/F 100. When the information 420 is used in the machine learning engine 510 in the on-premises system 5, the fog P/F 400 transmits the information 420 to the on-premises system 5. Similarly, different statistical analysis engines may be used to determine different types of information.

Figure 12:
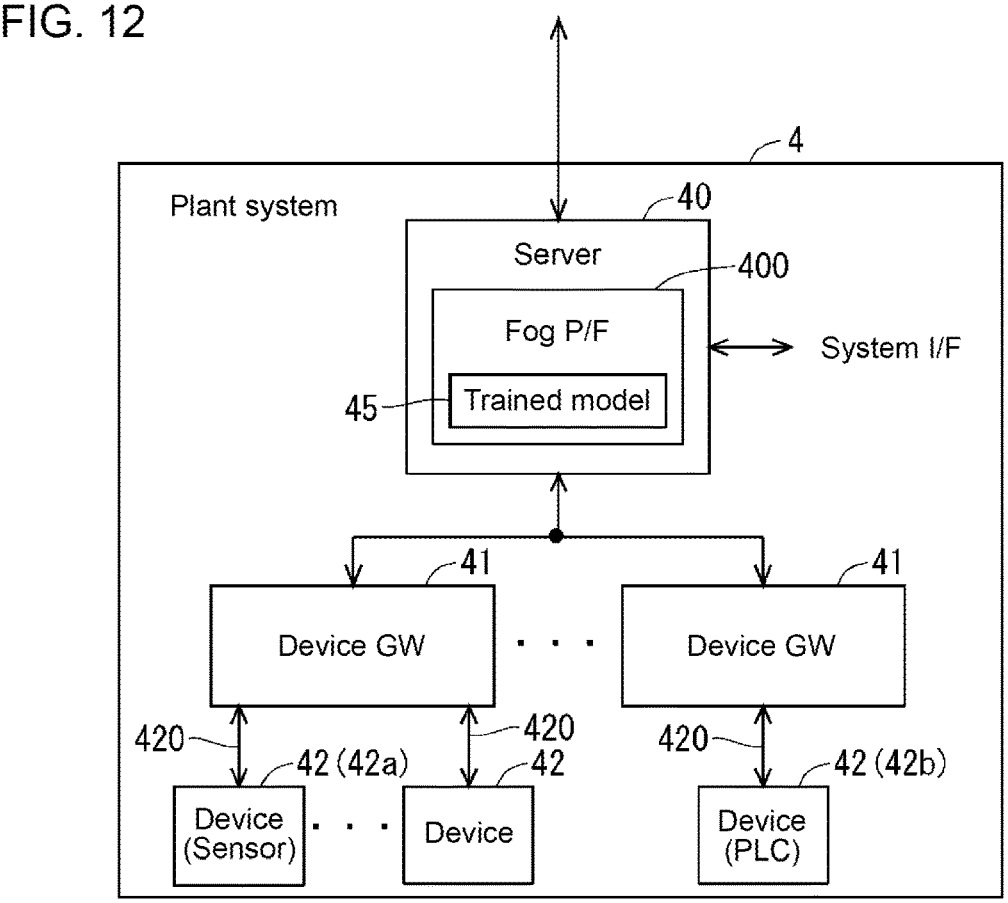
FIG. 12 illustrates a block diagram of a plant system showing an example configuration.

The same trained model as a trained model for a plant generated outside the intranet 2 may be established in the plant system 4 installed in the plant. FIG. 12 shows an example configuration including the same trained model 45 as a trained model for a plant generated outside the intranet 2 established in the fog P/F 400 in the plant system 4 installed in the plant. The trained model 45 may be a first cloud trained model generated in the machine learning engine 101 or a second cloud trained model generated in the machine learning engine 111.

In the example in FIG. 12, the fog P/F 400 can input the information 420 from the device GW 41 into its trained model 45. This enables the fog P/F 400 to promptly obtain an inference from machine learning. The configuration is thus higher in real-time responsiveness in the processing. For example, the trained model 45 may be capable of identifying an abnormality in manufacturing equipment. In this case, when an abnormality occurs in the manufacturing equipment, the fog P/F 400 enables the manufacturing equipment to be stopped promptly through the device GW 41 and the PLC 42b.

Figure 13:
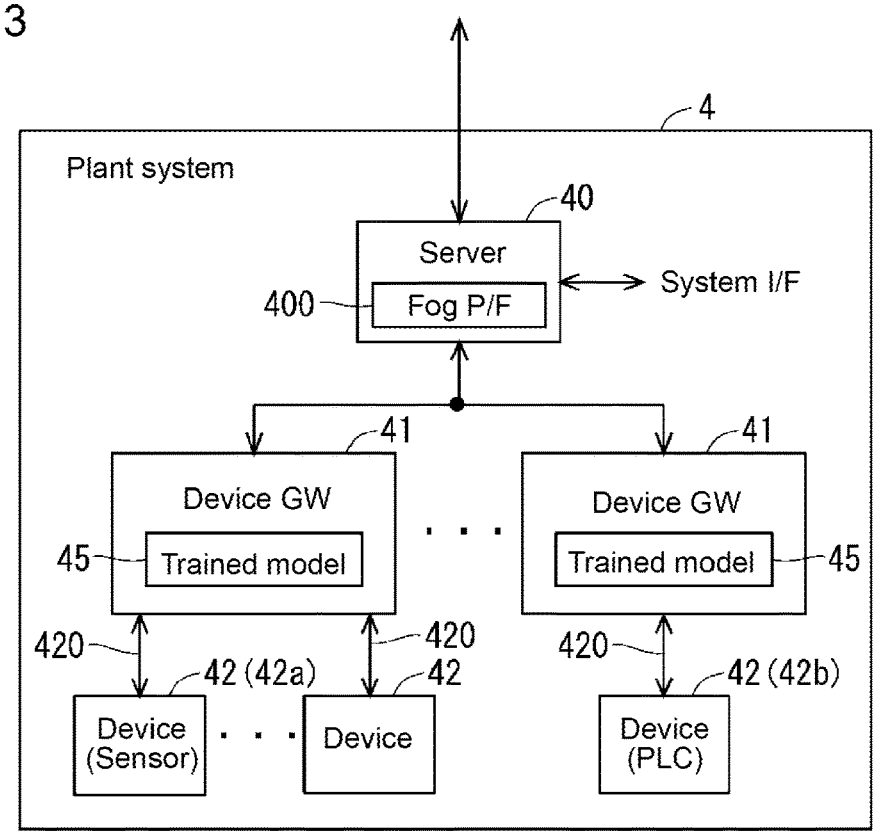
FIG. 13 illustrates a block diagram of a plant system showing an example configuration.

FIG. 13 shows an example system including the trained model 45 established in each device GW 41. In the example in FIG. 13, the trained model 45 in the device GW 41 receives the information 420 from any device 42 connected to the device GW 41. In the example in FIG. 13, the device GW 41 can input the information 420 from the device 42 to its trained model 45. This enables the device GW 41 to promptly obtain an inference from machine learning. The configuration is thus higher in real-time responsiveness in the processing than the configuration in the example in FIG. 12.

When the same trained model 45 as the first cloud trained model generated by the machine learning engine 101 in the cloud P/F 100 is established in a plant system 4, the cloud P/F 100 outputs data representing the first cloud trained model to the fog P/F 400 in the plant system 4. The fog P/F 400 establishes the trained model 45 either internally or in the device GWs 41 based on the data representing the first cloud trained model. For a plant system 4 with the trained model 45 established, the system change information described above may include specific information that identifies the trained model 45.

When the same trained model 45 as the second cloud trained model generated by the machine learning engine 111 in the cloud P/F 110 is established in a plant system 4, the cloud P/F 110 outputs data representing the second cloud trained model. The fog P/F 400 in the plant system 4 receives the data output from the cloud P/F 110. The fog P/F 400 establishes the trained model 45 either internally or in the device GWs 41 based on the data representing the second cloud trained model. The fog P/F 400 in the plant-D system 4d receives the data representing the second cloud trained model through the cloud server 10. Thus, in the plant-D system 4d, the trained model 45 is established through the cloud server 10.

Similarly, the same trained model as a trained model for a plant generated in the on-premises system 5 (on-premises trained model) may be established in the plant system 4 installed in the plant.

Figure 14:
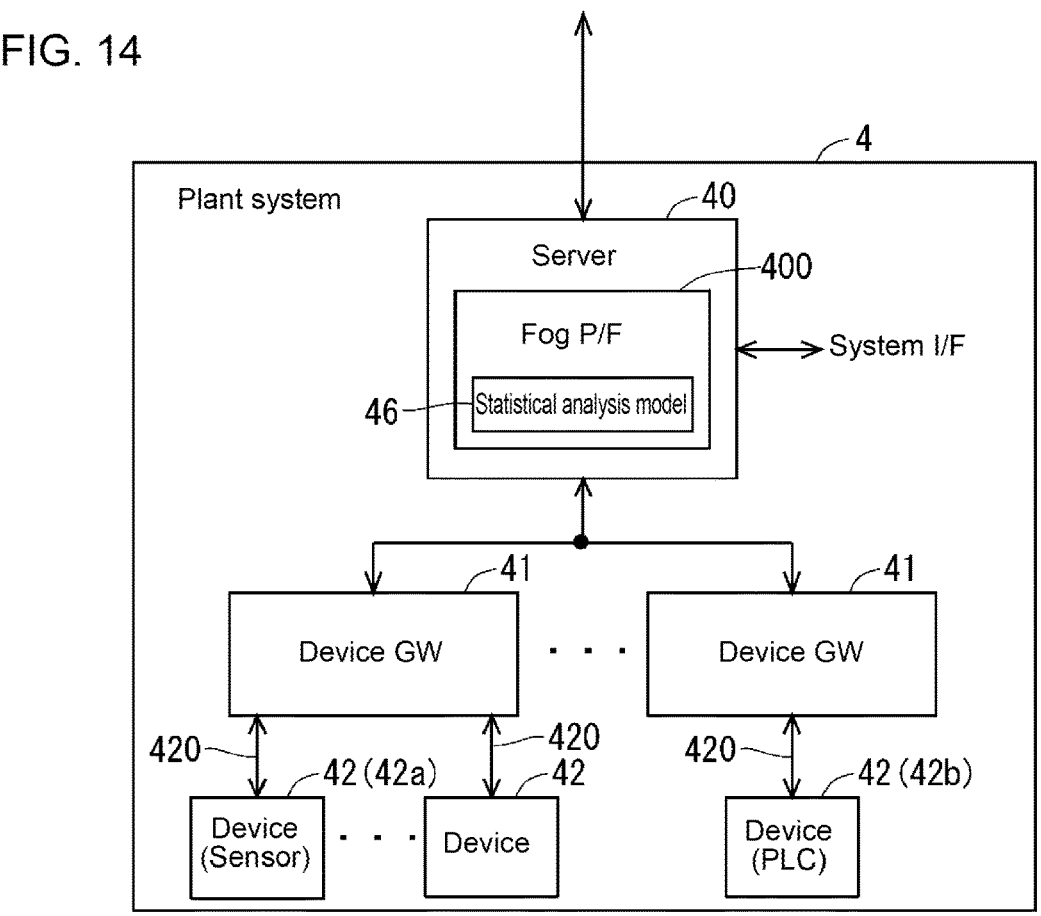
FIG. 14 illustrates a block diagram of a plant system showing an example configuration.
Figure 15:
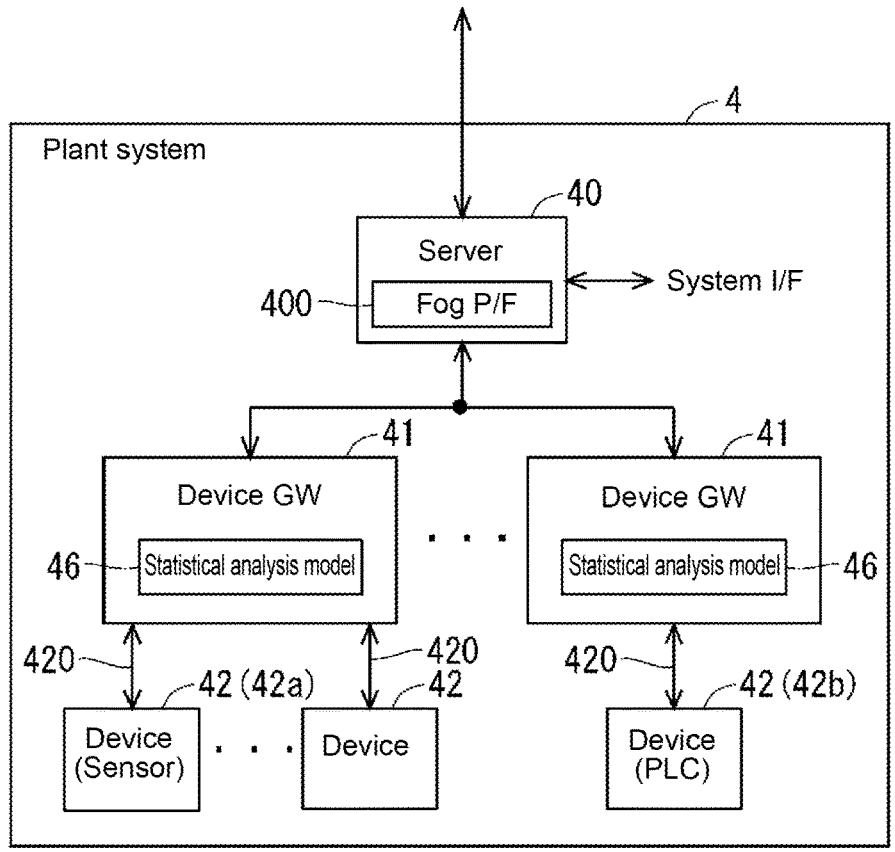
FIG. 15 illustrates a block diagram of a plant system showing an example configuration.

The same statistical analysis model 46 as a statistical analysis model for a plant generated outside the intranet 2 may be established in the plant system 4 installed in the plant. FIG. 14 shows an example system including the statistical analysis model 46 established in the fog P/F 400. FIG. 15 shows an example system including the statistical analysis model 46 established in each device GW 41. For a plant system 4 with the statistical analysis model 46 established, the system change information described above may include specific information that identifies the statistical analysis model 46.

Similarly, the same statistical analysis model as a statistical analysis model for a plant generated in the on-premises system 5 (on-premises statistical analysis model) may be established in the plant system 4 installed in the plant.

Combined Use of Models

Figure 16:
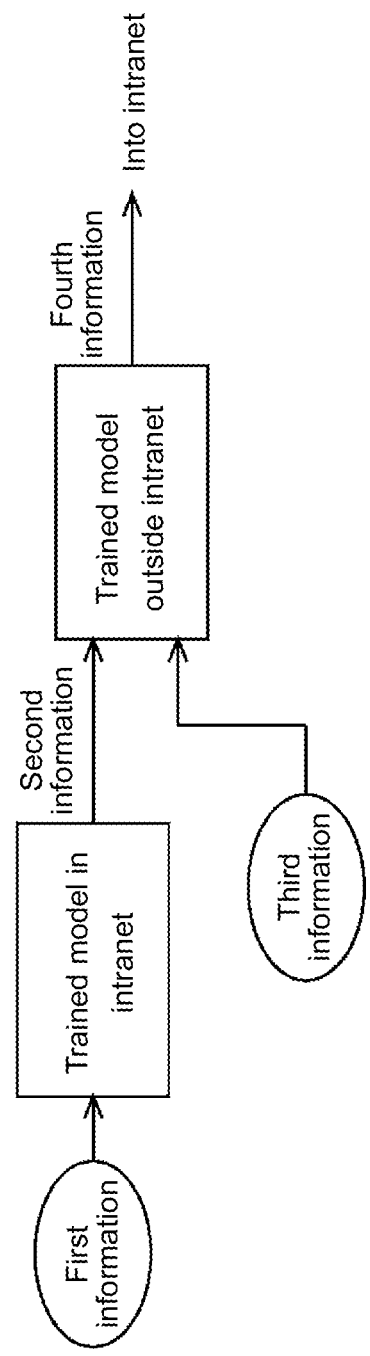
FIG. 16 illustrates a diagram describing an operation example of the information processing system.

The information processing system 1 in this example may use multiple trained models in combination. For example, the machine learning engine 510 in the intranet 2 inputs first information into a trained model to infer second information. The machine learning engine 101 outside the intranet 2 then inputs the second information and third information into a trained model to infer fourth information. FIG. 16 shows this process.

As shown in FIG. 16, the trained model in the intranet 2 receives the first information. The trained model outside the intranet 2 then receives the second information output from the trained model in the intranet 2, and the third information. The trained model outside the intranet 2 outputs the fourth information. For example, the intranet 2 receives the fourth information. Specific examples of the process shown in FIG. 16 will now be described. An operation example of the information processing system 1 for determining, through the process in FIG. 16, the order quantity and timing for an agent used in the wastewater treatment system of plant A (also referred to as a first agent) will now be described.

For example, the machine learning engine 510 in the intranet 2 generates an on-premises trained model that infers the tentative order quantity and timing (second information) for the first agent (such as an adjusting agent or a separating agent). The machine learning engine 101 outside the intranet 2 generates a first cloud trained model that infers the final order quantity and timing (fourth information) for the first agent.

The on-premises trained model receives the first information such as information with high confidentiality. For example, the on-premises trained model receives the current stock of the first agent, the order information about the first agent, and the production plan information in plant A. The order information includes, for example, the order quantity of the ordered first agent and the arrival time of the ordered first agent. The production plan information includes, for example, information indicating the types of products and the time and the amount the products are to be manufactured in plant A. The state of the wastewater generated in plant A depends on the types and the amounts of the products manufactured in plant A. The production plan information is thus useful in determining the order quantity and timing for an agent.

The machine learning engine 510 obtains, at the inference stage, the current stock of the first agent, the order information about the first agent, and the production plan information in plant A from the production management information DB 503b in the division server 50 associated with the division owning plant A. The machine learning engine 510 then inputs the current stock of the first agent, the order information about the first agent, and the production plan information in plant A into the on-premises trained model to infer the tentative order quantity and timing for the first agent. The output information from the on-premises trained model, or the tentative order quantity and timing for the first agent, is provided to the fog P/F 400 in the plant-A system 4a. The fog P/F 400 provides the received output information from the on-premises trained model to the cloud P/F 100.

The first cloud trained model receives the output information from the on-premises trained model (second information). The first cloud trained model also receives third information such as information with low confidentiality. For example, the information with low confidentiality is temperature prediction information. The cloud server 10 may obtain temperature prediction information from, for example, a server outside the information processing system 1. The treatment bath that receives the agent is located outdoors, and the temperature of the wastewater in the treatment bath varies with changes in atmospheric temperature. The effectiveness of the agent depends on the temperature of the wastewater. For example, as the temperature of the wastewater decreases, the effectiveness of the agent decreases. Thus, when cold weather continues for several days, a large amount of agent is to be used. In this manner, the temperature prediction information affects the order quantity and timing for the agent.

The machine learning engine 101 in the cloud P/F 100 inputs the temperature prediction information obtained by the cloud server 10 and the output information from the on-premises trained model into the first cloud trained model to infer the final order quantity and timing for the first agent. The cloud P/F 100 provides information indicating the inferred order quantity and timing (fourth information) to the fog P/F 400 in the plant-A system 4a. The cloud server 10 does not store the inferred order quantity and timing, which have high confidentiality. The fog P/F 400 in the plant-A system 4a provides information indicating the order quantity and timing for the first agent to, for example, an ordering server in the on-premises system 5. The ordering server orders the first agent based on the order quantity and timing for the first agent.

In another example, for the wastewater treatment system of a plant with an intra-plant system 4, the amounts of adjusting agent and separating agent used in the same treatment bath may be determined using multiple trained models. The intra-plant system 4 being focused may be hereafter referred to as a target intra-plant system 4. The plant with the target intra-plant system 4 may be referred to as a target plant.

For example, the fog P/F 400 in the target intra-plant system 4 transmits the determined temperatures with low confidentiality from the device GW 41 to the cloud server 10. The cloud server 10 stores the determined temperatures from the fog P/F 400 into the storage 153. The fog P/F 400 transmits the determined pH and the captured images with high confidentiality from the device GW 41 to the on-premises system 5, instead of transmitting the information to the cloud server 10. The on-premises system 5 stores the determined pH and the captured images into the technical information DB 503d in the division server 50 associated with the division owning the target plant. The machine learning engine 510 in the on-premises system 5 generates an on-premises trained model that infers the tentative amount of adjusting agent to be placed and the tentative amount of separating agent to be placed. The machine learning engine 101 outside the intranet 2 generates a first cloud trained model that infers the final amount of adjusting agent to be placed and the final amount of separating agent to be placed.

The machine learning engine 510 obtains, at the inference stage, the determined pH and the captured images from the technical information DB 503d in the division server 50. The machine learning engine 510 then inputs the determined pH and the captured images into the on-premises trained model to infer the tentative amounts of adjusting agent and separating agent. The output information from the on-premises trained model, or the tentative amounts of adjusting agent and separating agent, are provided to the fog P/F 400 in the target intra-plant system 4. The fog P/F 400 provides the received output information from the on-premises trained model to the cloud P/F 100.

The machine learning engine 101 in the cloud P/F 100 obtains, at the inference stage, the determined temperatures from the storage 153. The machine learning engine 101 then inputs the determined temperatures, and the output information provided from the on-premises trained model and received from the fog P/F 400 into the first cloud trained model to infer the final amounts of adjusting agent and separating agent. The cloud P/F 100 provides information indicating the inferred amounts (fourth information) to the fog P/F 400 in the target intra-plant system 4. The cloud server 10 does not store the inferred amounts with high confidentiality. The fog P/F 400 in the target intra-plant system 4 provides the information indicating the inferred amounts to the device GW 41, which is connected with the PLC 42b that controls the adjustor placement device and the separator placement device. The device GW 41 sets the amounts to the PLC 42b. The PLC 42b controls the adjustor placement device to place the adjusting agent into the treatment bath by the set amount. The PLC 42b also controls the separator placement device to place the separating agent into the treatment bath by the set amount. In this manner, the target intra-plant system 4 allows the device 42 to be controlled based on the fourth information output from the first cloud trained model.

As described above, in the example in FIG. 16, the trained model in the intranet 2 receives the first information in the intranet 2, and the trained model outside the intranet 2 receives the output information from the trained model in the intranet 2. Although the trained model outside the intranet 2 is used, this process reduces the possibility that the first information in the intranet 2 leaks from the intranet 2. The confidentiality of the first information is thus protected more reliably.

Additionally, the fog P/F 400 in the plant system 4 does not transmit, to the cloud P/F 100, the information 420 with high confidentiality such as the captured images obtained from the devices 42, thus reducing the possibility that the information 420 with high confidentiality generated in the plant system 4 leaks from the intranet 2.

In the above example, the trained model outside the intranet 2 in FIG. 16 is the first cloud trained model. However, the trained model may be the second cloud trained model of the machine learning engine 111.

Figure 17:
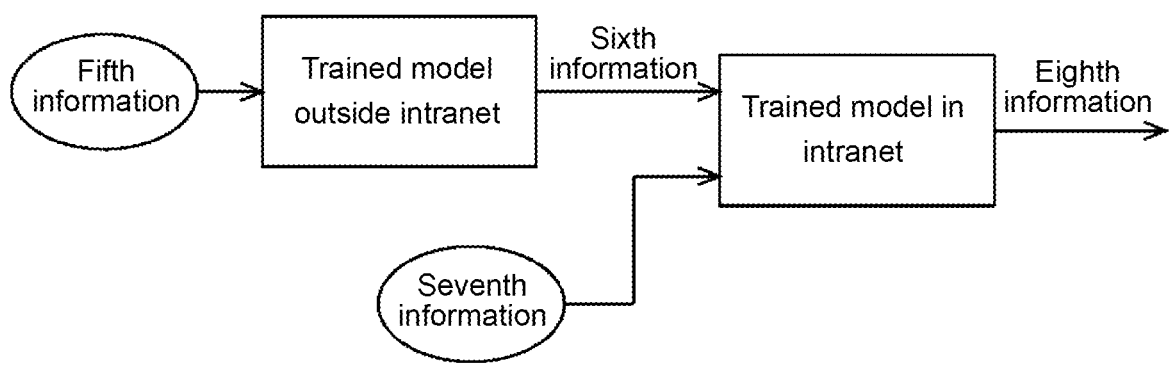
FIG. 17 illustrates a diagram describing an operation example of the information processing system.

The on-premises trained model in the intranet 2 may receive information in the intranet 2 and output information from a first cloud trained model outside the intranet 2. FIG. 17 shows this process.

As shown in FIG. 17, the trained model outside the intranet 2 receives fifth information. The trained model in the intranet 2 then receives sixth information output from the trained model outside the intranet 2, and seventh information in the intranet 2. The trained model in the intranet 2 outputs eighth information. Specific examples of the process shown in FIG. 17 will now be described. An operation example of the information processing system 1 for determining, through the process in FIG. 17, the order quantity and timing for an agent used in the wastewater treatment system of plant B (hereafter also referred to as a second agent) will now be described.

For example, based on information from a device outside the information processing system 1 (fifth information), the first cloud trained model outputs temperature prediction information (sixth information). The on-premises trained model infers the order quantity and timing for the second agent (eighth information).

The machine learning engine 101 outputs the output information from the first cloud trained model, or the temperature prediction information, to the fog P/F 400 in the plant-B system 4b. The fog P/F 400 outputs the temperature prediction information to the on-premises system 5. The on-premises system 5 inputs the temperature prediction information into the machine learning engine 510.

The machine learning engine 510 obtains, at the inference stage, the current stock of the second agent, order information about the second agent, and production plan information in plant B (seventh information) from the production management information DB 503b in the division server 50 associated with the division owning plant B. The machine learning engine 510 then inputs the current stock of the second agent, the order information about the second agent, the production plan information in plant B, and the temperature prediction information into the on-premises trained model to infer the order quantity and timing for the second agent. The computer 51 provides information indicating the order quantity and timing for the second agent determined in the machine learning engine 510 to the fog P/F 400 in the plant-B system 4b. The fog P/F 400 in the plant-B system 4b provides the information indicating the order quantity and timing for the second agent to, for example, the ordering server in the on-premises system 5. The ordering server orders the second agent based on the order quantity and timing for the second agent.

In another example, for the wastewater treatment system of a plant with an intra-plant system 4, the amounts of adjusting agent and separating agent used in the same treatment bath may be determined through the process in FIG. 16. This example will now be described.

For example, the fog P/F 400 in the target intra-plant system 4 transmits the determined temperatures from the device GW 41 to the cloud server 10. The cloud server 10 stores the determined temperatures from the fog P/F 400 into the storage 153. The determined temperatures represent the temperatures of the wastewater in the treatment bath before the adjusting agent and the separating agent are placed. The first cloud trained model in the cloud server 10 receives the determined temperatures in the storage 153 (fifth information). The first cloud trained model receives the temperature prediction information (fifth information) obtained from a server outside the information processing system 1. The first cloud trained model then outputs temperature prediction information about the wastewater in the treatment bath (sixth information). The output information from the first cloud trained model is provided to the fog P/F 400 in the target intra-plant system 4. The fog P/F 400 provides the output information from the first cloud trained model to the on-premises system 5. The on-premises system 5 inputs the output information from the first cloud trained model into the machine learning engine 510.

The effectiveness of the adjusting agent and the separating agent depends on the temperature of the wastewater. Thus, the temperature prediction information about the wastewater affects the amounts of adjusting agent and separating agent to be placed. For example, when the temperature of the wastewater is predicted to decrease, the amounts of the adjusting agent and the separating agent may be increased. In this example, the on-premises trained model infers the amounts of adjusting agent and separating agent to be placed based on the output information from the first cloud trained model, or the temperature prediction information about the wastewater.

The fog P/F 400 in the target intra-plant system 4 transmits the determined pH and the captured images from the device GW 41 to the on-premises system 5. The on-premises system 5 stores the determined pH and the captured images into the technical information DB 503d in the division server 50 associated with the division owning the target plant. The machine learning engine 510 obtains, at the inference stage, the determined pH and the captured images from the technical information DB 503d in the division server 50. The machine learning engine 510 then inputs the determined pH and the captured images (seventh information) into the on-premises trained model. The machine learning engine 510 also inputs the output information from the first cloud trained model, or the temperature prediction information about the wastewater, into the on-premises trained model. The on-premises trained model outputs the amounts of adjusting agent and separating agent (eighth information).

Information indicating the amounts of adjusting agent and separating agent is provided to the fog P/F 400 in the target intra-plant system 4. The fog P/F 400 provides the received information indicating the amounts to the device GW 41, which is connected with the PLC 42b that controls the adjustor placement device and the separator placement device. The device GW 41 sets the amounts to the PLC 42b. The PLC 42b controls the adjustor placement device to place the adjusting agent into the treatment bath by the set amount. The PLC 42b also controls the separator placement device to place the separating agent into the treatment bath by the set amount.

As described above, in the example in FIG. 17, the trained model in the intranet 2 receives the sixth information output from the trained model outside the intranet 2 and the seventh information in the intranet 2. Although the trained model outside the intranet 2 is used, this process reduces the possibility that the seventh information in the intranet 2 leaks from the intranet 2. The confidentiality of the seventh information is thus protected more reliably.

In the above example, the trained model outside the intranet 2 in FIG. 17 is the first cloud trained model. However, the model may be the second cloud trained model of the machine learning engine 111.

The information 420 obtained in one plant system 4 may be used as the first information for the process shown in FIG. 16, and the information 420 obtained in another plant system 4 may be used as the seventh information for the process shown in FIG. 17. The information 420 obtained in the same plant system may be used for the process shown in FIG. 16 and the process shown in FIG. 17.

Similarly to the combined use of multiple trained models, the information processing system 1 may use multiple statistical analysis models in combination. In the configuration shown in FIG. 16, for example, the trained model in the intranet 2 may be replaced with the on-premises statistical analysis model generated in the statistical analysis engine 520, and the trained model outside the intranet 2 may be replaced with the cloud statistical analysis model generated in the statistical analysis engine 121. In the configuration shown in FIG. 17, the trained model in the intranet 2 may be replaced with the on-premises statistical analysis model, and the trained model outside the intranet 2 may be replaced with the cloud statistical analysis model.

Other Examples of Information Processing System

The fog P/F 400 in each plant system 4 may transmit the information 420 from a device 42 to the cloud P/F 100 irrespective of its confidentiality. In this case, for example, the cloud fog P/F 400 for the cloud P/F 100 may store the information 420 from the plant system 4 with low confidentiality into the storage 153. In contrast, the cloud fog P/F 400 may store the information 420 from the plant system 4 with high confidentiality into the on-premises system 5, instead of storing the information in the storage 153. In the on-premises system 5, for example, the storage 503 in the division server 50 stores the information 420 from the cloud fog P/F 400.

The information processing system 1 may not include the cloud server 11 or 12. The cloud P/F 100 in the cloud server 10 may include a statistical analysis engine. In this case, the statistical analysis engine in the cloud P/F 100 may be substituted for the statistical analysis engine 520 or the statistical analysis engine 121. The information processing system 1 may include either the machine learning engine or the statistical analysis engine in the intranet 2. The information processing system 1 may include either the machine learning engine or the statistical analysis engine outside the intranet 2. At least one of the cloud server 10, 11, or 12 may be separate from the information processing system 1 and may not be included in the information processing system 1.

The information processing system 1 may include an extra-plant system 4 other than the plant-D system 4*d*. The extra-plant system 4 may not be a system belonging to the specific corporation, but may be a system belonging to an organization associated with the specific corporation. For example, the extra-plant system 4 may be a system belonging to a subsidiary of the specific corporation or a system belonging to an associated company of the specific corporation. The extra-plant system 4 may also be a system belonging to a subcontracting company of the specific corporation. The plant-D system 4*d* may be installed in the intranet 2. The information processing system 1 may not include an extra-plant system 4.

In place of the plant systems 4, the information processing system 1 may include systems having the same configuration as the plant systems 4 and installed in places other than plants. For example, the information processing system 1 may include a system installed in a hospital. The information processing system 1 may include a system installed in a college. The information processing system 1 with systems installed in places other than plants can operate in the same manner as described above.

The information processing system 1 has been described in detail as above, but the foregoing structures are illustrative in all respects, and the disclosure is not limited to the above structures. All the features of the embodiments described above may be combined in use unless any contradiction arises. Many modifications not specifically described above may be implemented without departing from the scope of the disclosure.

The invention claimed is:

1. An information processing system comprising:
    a first trained model in an intranet, the first trained model being a machine learning model using a first machine learning technique; and
    a second trained model outside the intranet, the second trained model using a second machine learning technique different from the first machine learning technique;
    wherein first information is input to the first trained model, second information is output from the first trained model in response to the input first information, the first information being confidential information, and
    the second information is input to the second trained model with third information that is not confidential information.

2. The information processing system according to claim 1, wherein the first system performs processing based on first information obtained from the second system through the server.

3. The information processing system according to claim 2, wherein the first system generates a first trained model based on the first information, and the first trained model includes a machine learning model or a statistical analysis model.

4. The information processing system according to claim 2, wherein
    the second system includes at least one of a sensor or a programmable logic controller, and
    the first information includes information obtained from at least one of the sensor or the programmable logic controller.

5. The information processing system according to claim 3, wherein the first system inputs second information obtained from the second system through the server into the first trained model and provides output information from the first trained model to the second system through the server in response to an input of the second information.

6. The information processing system according to claim 3, wherein
    the first trained model is established as a second trained model in the second system through the server, and
    the second system inputs second information obtained by the second system into the second trained model.

7. The information processing system according to claim 5, wherein
    the second system includes at least one of a sensor or a programmable logic controller, and
    the second information includes information obtained from at least one of the sensor or the programmable logic controller.

8. The information processing system according to claim 1, wherein
    the first system provides information indicating a status of the first system to the second system through the server, and
    the second system provides information indicating a status of the second system to the first system through the server.

9. The information processing system according to claim 8, wherein
    the first system performs information processing in accordance with the status of the second system, and
    the second system performs information processing in accordance with the status of the first system.

10. The information processing system according to claim 1, wherein
    the first system includes a plurality of third systems installed at different locations, and
    the plurality of third systems each communicate with the second system through the server.

11. The information processing system according to claim 1, wherein the first machine learning technique is one of deep learning, unsupervised learning, supervised learning, reinforcement learning, and deep reinforcement learning.

12. The information processing system according to claim 1, wherein the second machine learning technique is one of deep learning, unsupervised learning, supervised learning, reinforcement learning, and deep reinforcement learning.

13. The information processing system according to claim 1, wherein the first machine learning technique is one of deep learning, unsupervised learning, supervised learning, reinforcement learning, and deep reinforcement learning and the second machine learning technique is different from the first machine learning technique and is one of deep learning, unsupervised learning, supervised learning, reinforcement learning, and deep reinforcement learning.

14. An information processing system comprising:
- a first trained model in an intranet, the first trained model being a machine learning model using a first machine learning technique; and
- a second trained model outside the intranet, the second trained model using a second machine learning technique different from the first machine learning technique;
- wherein first information and second information is input to the first trained model, the first information is from the intranet and is confidential information and the second information is an output from the second trained model.

15. The information processing system according to claim 14, wherein the first machine learning technique is one of deep learning, unsupervised learning, supervised learning, reinforcement learning, and deep reinforcement learning.

16. The information processing system according to claim 14, wherein the second machine learning technique is one of deep learning, unsupervised learning, supervised learning, reinforcement learning, and deep reinforcement learning.

17. The information processing system according to claim 14, wherein the first machine learning technique is one of deep learning, unsupervised learning, supervised learning, reinforcement learning, and deep reinforcement learning and the second machine learning technique is different from the first machine learning technique and is one of deep learning, unsupervised learning, supervised learning, reinforcement learning, and deep reinforcement learning.

* * * * *